(12) United States Patent
Tighineanu et al.

(10) Patent No.: US 12,366,851 B2
(45) Date of Patent: Jul. 22, 2025

(54) SYSTEM, DEVICE, AND METHOD FOR CONTROLLING A PHYSICAL OR CHEMICAL PROCESS

(71) Applicant: Robert Bosch GmbH, Stuttgart (DE)

(72) Inventors: Petru Tighineanu, Ludwigsburg (DE); Attila Reiss, Renningen (DE); Felix Berkenkamp, Munich (DE); Julia Vinogradska, Gerlingen (DE); Kathrin Skubch, Frankfurt (DE); Paul Sebastian Baireuther, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 498 days.

(21) Appl. No.: 17/950,542

(22) Filed: Sep. 22, 2022

(65) Prior Publication Data

US 2023/0097371 A1 Mar. 30, 2023

(30) Foreign Application Priority Data

Sep. 27, 2021 (DE) .................. 10 2021 210 774.5

(51) Int. Cl.
| | |
|---|---|
| *G05B 19/418* | (2006.01) |
| *B25J 9/16* | (2006.01) |
| *G05B 13/02* | (2006.01) |
| *G05B 13/04* | (2006.01) |
| *G05B 15/02* | (2006.01) |

(52) U.S. Cl.
CPC ........ *G05B 19/41885* (2013.01); *B25J 9/163* (2013.01); *G05B 13/0265* (2013.01); *G05B 13/042* (2013.01); *G05B 15/02* (2013.01)

(58) Field of Classification Search
CPC .............. G05B 13/042; G05B 15/02; G05B 13/0265; G05B 19/41885; G06F 18/24155
USPC ...................................... 700/28, 41
See application file for complete search history.

(56) References Cited

U.S. PATENT DOCUMENTS

| | | | |
|---|---|---|---|
| 9,864,953 B2 * | 1/2018 | Adams ..................... | G06N 7/01 |
| 2018/0349158 A1 * | 12/2018 | Swersky ................ | G06N 20/00 |

(Continued)

FOREIGN PATENT DOCUMENTS

| | | | | |
|---|---|---|---|---|
| BR | 112015029806 A2 * | 7/2017 | .............. | G06F 17/11 |
| DE | 102023208510 A1 * | 3/2025 | .............. | G06F 30/17 |
| EP | 3716160 A1 * | 9/2020 | .............. | G06F 17/16 |

OTHER PUBLICATIONS

Karbalayghareh et al., "Optimal Bayesian Transfer Learning," IEEE Transactions on Signal Processing, vol. 66., No. 14, 2018, pp. 3724-3739.

(Continued)

*Primary Examiner* — Ronald D Hartman, Jr.
(74) *Attorney, Agent, or Firm* — NORTON ROSE FULBRIGHT US LLP

(57) ABSTRACT

A system, a device and a method for controlling a physical or chemical process. The method includes: determining a second a posteriori model based on a first a posteriori model that describes the relationship between an input variable and an output variable of a process related to the physical/ chemical process, the second a posteriori model describing the relationship between an input variable and an output variable of the physical or chemical process; and controlling the physical or chemical process using the second a posteriori model.

8 Claims, 10 Drawing Sheets

(56) References Cited

U.S. PATENT DOCUMENTS

2020/0327264 A1* 10/2020 Wang ............... H02J 3/008
2021/0011447 A1* 1/2021 Nguyen-Tuong ...... G06N 20/00

OTHER PUBLICATIONS

Xu et al., "Multi-Task Learning With Task Relations," 2011 11th IEEE International Conference on Data Mining, 2011, pp. 884-893.
Skolidis, "Transfer Learning With Gaussian Processes," the University of Edinburgh, 2012, pp. 1-201.
Shilton et al., "Regret Bounds for Transfer Learning in Bayesian Optimisation," Proceedings of the 20th International Conference on Artificial Intelligence and Statistics (AISTATS), JMLR: W&CP, 2017, vol. 54, pp. 1-9.
Golovin et al., "Google Vizier: a Service for Black-Box Optimization," KDD 2017 Applied Data Science Paper, 2017, pp. 1487-1496. <https://dl.acm.org/doi/pdf/10.1145/3097983.3098043> Downloaded Sep. 20, 2022.
Jones et al., "Efficient Global Optimization of Expensive Black-Box Functions," Journal of Global Optimization, vol. 13, 1998, pp. 455-492. <http://www.ressources-actuarielles.net/EXT/ISFA/1226.hsf/8d48b7680058e977c1256d65003ecbb5/f84f7ac703bf5862c12576d8002f5259/$FILE/Jones98.pdf> Downloaded Sep. 20, 2022.
Srinivas et al., "Gaussian Process Optimization in the Bandit Setting: No. Regret and Experimental Design," Proceedings of the 27th International Conference on Machine Learning, Haifa, Israel, 2010, pp. 1-8. <https://icml.cc/Conferences/2010/papers/422.pdf> Downloaded Sep. 20, 2022.

* cited by examiner

SYSTEM, DEVICE, AND METHOD FOR CONTROLLING A PHYSICAL OR CHEMICAL PROCESS

CROSS REFERENCE

The present application claims the benefit under 35 U.S.C. § 119 of German Patent Application No. DE 10 2021 210 774.5 filed on Sep. 27, 2021, which is expressly incorporated herein by reference in its entirety.

FIELD

Various exemplary embodiments generally relate to a system, a device and a method for controlling a physical or chemical process.

BACKGROUND INFORMATION

In production processes and machining processes (e.g., drilling, milling, heat treatment, etc.), process parameters such as a process temperature, a process time, a vacuum or a gas atmosphere etc. are set such that desired properties, such as hardness, strength, thermal conductivity, electrical conductivity, density, microstructure, macrostructure, chemical composition, etc., of a workpiece are achieved. The process parameters can be determined by model-based optimization methods, such as Bayesian optimization methods. In this case, a model for the production or machining process can be determined on the basis of measurement data. However, this can require large quantities of measurement data and therefore high expenditure (e.g., time expenditure and/or costs). This expenditure can be reduced by determining the model on the basis of a model already learned that describes a process related to the production or machining process in conjunction with the measurement data (also referred to as transfer learning). For example, both models can describe drilling or milling on different machines (and with comparable process parameters). The model already learned can serve as a basis for the model to be learned and therefore reduce the required quantity of measurement data.

The paper "Google Vizier: A Service for Black-Box Optimization" by D. Golovin et al., KDD 2017 Applied Data Science Paper, 2017 (hereinafter referred to as reference [1]) describes hierarchical transfer learning in which a model is determined as a Gaussian process on the basis of a model already learned as a Gaussian process and on the basis of measurement data.

In order to learn a model in accordance with a Bayesian optimization method, a new measurement point can be determined in each iteration by means of an acquisition function. Examples of acquisition functions are described in the papers "Efficient global optimization of expensive black-box functions" by D. Jones et al., Journal of Global optimization, 1998 (hereinafter referred to as reference [2]) and "Gaussian process optimization in the bandit setting: No regret and experimental design" by N. Srinivas et al., Proc. International Conference on Machine Learning (ICML), 2010 (hereinafter referred to as reference [3]).

Measurements that characterize at least one property of a production or machining process and/or at least one of the effects of the process on a workpiece can be subject to fluctuations, even in the case of identical process parameters. These fluctuations can result from the process itself, from the workpiece, and from measurement errors. Due to these fluctuations and/or due to less measurement data, a learned model can have high inaccuracies and/or uncertainties in areas with little or no measurement data. According to various embodiments, it has been recognized that a learning effort (e.g., an optimization efficiency) during transfer learning can be reduced if both the uncertainties of the model already learned and the uncertainties of the model to be learned are taken into account.

SUMMARY

A method, device and system having the features of the present invention may allow efficient optimization of a model. In this case, the amount of measurement data required is reduced, as a result of which expenditure (e.g., time expenditure and/or costs) for learning of the model can be reduced. Illustratively, in the context of transfer learning, only a few measurements are required to adapt a model already learned for a similar process to the new process. Furthermore, the consideration described herein of the uncertainties of the model already learned leads to increased accuracy of the model learned for the new process (for example increased accuracy of the expected value of the learned model and the uncertainty taken into account with respect to this expected value). In accordance with various embodiments, it is also possible to learn a model if only little data is present and/or if the model already learned for the similar process exhibits great uncertainties.

A method having the features of the present invention forms a first example. According to an example embodiment of the present invention, the is for controlling a physical or chemical process, wherein each measurement point of known measurement points has an input parameter value of at least one input variable of the physical or chemical process and an output value, associated with the input parameter value, of at least one output variable of the physical or chemical process, and wherein a first a posteriori model describes the relationship between at least one input variable and at least one output variable of another process related to the physical or chemical process, the method comprising:

determining a second a posteriori model using the first a posteriori model, wherein the second a posteriori model describes the relationship between the at least one input variable and at least one output variable of the physical or chemical process, wherein the determining comprises:

determining a plurality of Gaussian processes having a common covariance function, wherein each Gaussian process is determined by drawing a function from the first a posteriori model and forming the expected value of the Gaussian process; and determining an a priori model as a mean value of the plurality of Gaussian processes and determining the second a posteriori model by optimizing hyperparameters of the model using the known measurement points in such a way that at least one hyperparameter of a covariance function of the first a posteriori model remains unchanged, and conditioning the model on the known measurement points, or conditioning each Gaussian process of the plurality of Gaussian processes on the known measurement points and determining the second a posteriori model as a mean value of the conditioned plurality of Gaussian processes; and controlling the physical or chemical process using a second a posteriori model.

Illustratively, at least one (e.g., exactly one or more than one) hyperparameter of the first a posteriori model cannot be optimized again.

A model described herein can be a statistical model and can be any type of mathematical representation describing a relationship between input variables and output variables of a physical or chemical process by means of Gaussian processes. The input variables and/or output variables of the physical or chemical process can also be input variables or output variables of another system. For example, the input variables can be parameters of a simulation (e.g., of the physical or chemical process). For example, the output variables can be approximation errors. For example, the output variables can be hyperparameters of a model based on machine learning and one or more loss values.

When the second a posteriori model is determined, all hyperparameters of the covariance function of the first a posteriori model can remain unchanged. The features described in this paragraph in combination with the first example form a second example. Illustratively, the second a posteriori model can be determined by optimizing the hyperparameters of the second model and conditioning on the known second measurement points, it being possible for the hyperparameters of the first a posteriori model to remain unchanged. Illustratively, all hyperparameters of the first a posteriori model cannot be optimized again.

The two options for determining the second a posteriori model in accordance with the first example can reduce a computational complexity and thus the computation effort (see, for example, table 1 and the associated description) by setting the hyperparameters of the first a posteriori model.

The method can further comprise: selecting a new input parameter value of the at least one input variable of the physical or chemical process by means of an acquisition function on the basis of the second a posteriori model; measuring the output value of the at least one output variable which is associated with the input parameter value, the selected new input parameter value and the measured new output value forming a new measurement point; and adapting the second a posteriori model using the new measurement point, the adapted second a posteriori model describing the physical or chemical process at the known measurement points and the new measurement point; the physical or chemical process being controlled using the adapted second a posteriori model. The features described in this paragraph in combination with the first example or the second example form a third example.

The two options for determining the second a posteriori model in accordance with the first or second example can have a lower computational complexity compared to other methods that also allow a propagation of the uncertainty (see, for example, table 1 and the associated description).

A third a posteriori model can describe the relationship between at least one input variable and at least one output variable of yet another process related to the physical or chemical process, and each other measurement point of known other measurement points can have an input parameter value of at least one input variable of the other process and an output value of at least one output variable, associated with the input parameter value, of the other process. The method can comprise: determining the first a posteriori model by taking into account the third a posteriori model, comprising: determining a plurality of other Gaussian processes having another common covariance function, each other Gaussian process being determined by drawing a function from the third a posteriori model and forming the expected value of the Gaussian process; and determining another a priori model as the mean value of the plurality of other Gaussian processes and determining the first a posteriori model by conditioning the other a priori model on the known other measurement points, or conditioning each other Gaussian process of the plurality of other Gaussian processes on the known other measurement points, and determining the first a posteriori model as the mean value of the conditioned plurality of other Gaussian processes. The features described in this paragraph in combination with one or more of the first example to the third example form a fourth example. Alternatively, the first a posteriori model can be determined in another way. For example, the first a posteriori model can be determined by means of the hierarchical Gaussian process in accordance with reference [1] where $\beta=1$.

Illustratively, the second a posteriori model can be determined as a sequence of a plurality of other models (e.g., the third a posteriori model and the first a posteriori model). The two options for determining the second a posteriori model in accordance with one or more of the first example to the third example can significantly increase efficiency for learning a model on the basis of a plurality of other models compared to other methods (see, for example, illustration 352 in FIG. 3B). Controlling the physical or chemical process using the second a posteriori model can comprise: determining an input parameter value of the at least one input variable, which input parameter value is associated with a desired output value of the at least one output variable of the physical or chemical process in accordance with the second a posteriori model; controlling the physical or chemical process in accordance with the determined input parameter value. The features described in this paragraph in combination with one or more of the first example to the fourth example form a fifth example.

Illustratively, the second a posteriori model can take into account the uncertainty of the first a posteriori model (and the third a posteriori model in accordance with the fourth example), which leads to increased accuracy (e.g., the expected value and/or the information regarding uncertainty) of the second a posteriori model.

A device can be configured to carry out the method according to one or more of the first example to the fifth example. The device having the features described in this paragraph forms a sixth example.

A device described herein for carrying out a (e.g., physical or chemical) process can be any type of computer-controlled device, such as a robot (e.g., a manufacturing robot, a maintenance robot, a domestic robot, a medical robot, etc.), a vehicle (e.g., an autonomous vehicle), a household appliance, a production machine, a personal assistant, an access control system, etc. A device described herein for carrying out a (e.g., physical or chemical) process can also be a non-computer-controlled device. For example, the device can be manually controlled by a user to carry out the (e.g., physical or chemical) process. In general, a device can, for example, be a production device for producing products or a machining device for machining workpieces (for example a drilling device or a milling device), a robot device that executes movements, for example, a device for active ingredient design, for example a pharmaceutical, a device for designing a system, for example for aerospace applications, etc.

A system can comprise: a device that is configured to carry out the physical or chemical process; and a control device that is configured to determine an input parameter value associated with the desired output value for a desired output value of the at least one output variable of the physical or chemical process by means of a second a posteriori model determined according to one or more of the first example to the fifth example, and to control the device for carrying out the physical or chemical process in accordance with the determined input parameter value. The system having the features described in this paragraph forms a seventh example.

In the system, the physical or chemical process can be: machining a workpiece; setting (e.g., calibrating) a device (e.g., an instrument and/or a measuring apparatus); producing a product; or moving a robot arm. The features described in this paragraph in combination with the seventh example form an eighth example.

A computer program can have instructions that, when executed by a processor, cause the processor to carry out a method in accordance with one or more of the first example to the fifth example. The computer program having the features described in this paragraph forms a ninth example. It is understood that the processor can generate instructions for controlling the physical or chemical process (e.g., instructions for controlling the device).

A computer-readable medium (e.g., a computer program product, a non-volatile storage medium, a non-transitory storage medium, a non-volatile storage medium) can store instructions that, when executed by a processor, cause the processor to carry out a method according to one or more of the first example to the fifth example. The computer-readable medium having the features described in this paragraph forms a tenth example.

Exemplary embodiments of the present invention are illustrated in the figures and explained in more detail in the following description.

DETAILED DESCRIPTION OF EXAMPLE EMBODIMENTS

In one embodiment, a "computer" can be understood as any type of logic-implementing entity, which can be hardware, software, firmware, or a combination thereof. Therefore, in one embodiment, a "computer" can be a hardwired logic circuit or programmable logic circuit such as a programmable processor, for example a microprocessor (e.g., a CISC (complex instruction set computer) or a RISC (reduced instruction set computer)). A "computer" can have one or more processors. A "computer" can also be software that is implemented or executed by a processor, for example any type of computer program, for example a computer program that uses a virtual machine code, such as Java. Any other type of implementation of the respective functions described in more detail below can be understood as a "computer" according to an alternative embodiment.

Various exemplary embodiments relate to a system, a device and a method for controlling a physical or chemical process. In this case, a model that describes a physical or chemical process can be learned by means of transfer learning on the basis of another model already learned that describes a process related to the physical or chemical process, with both the uncertainty of the other model already learned and the uncertainty of the model to be learned being taken into account. Illustratively, this can significantly increase learning efficiency, and a model having significantly lower data quantities can be learned and/or a computation effort for determining the model can be reduced. This reduces not only a time expenditure and/or outlay of learning, but also increases the accuracy of the model learned for the physical or chemical process.

Figure 1A:
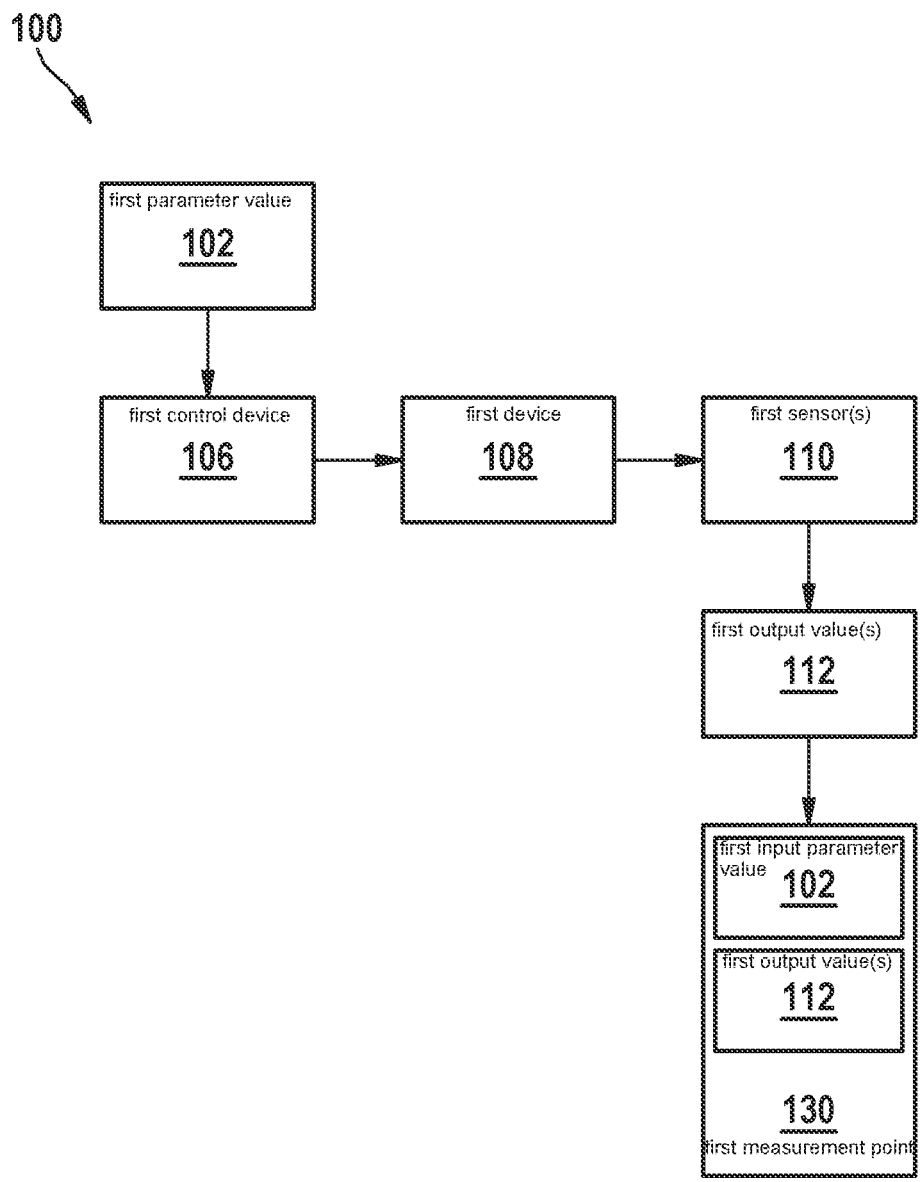
FIGS. 1A and 1B show learning of a first a posteriori model describing a process carried out by a first device according to various example embodiments of the present invention.

According to various embodiments, a second device 208 can carry out (e.g., perform) a physical or chemical process. FIG. 1A shows a first system 100 having a first device 108. The first device 108 can be configured to carry out another process related to the physical or chemical process.

A physical or chemical process, as used herein, can be any type of technical process, such as a manufacturing process (e.g., producing a product or intermediate product), a machining process (e.g., machining a workpiece), a control process (e.g., moving a robot arm), a setting process (e.g., calibrating a measuring apparatus), etc. For example, it may be necessary to set various manipulated variables of a device (e.g., within the scope of a calibration) and the physical or chemical process can be this setting. For example, the physical or chemical process in a heat treatment by means of a furnace can be a calibration of the furnace temperature and/or the vacuum.

It is understood that another process related to the physical or chemical process can also be a physical or chemical process as described herein.

Two processes can be related to one another in various ways. For example, they can be the same general process, such as drilling or milling of components that is carried out by means of various machines. It is understood that a generally identical process can also lead to individual results on different machines. Two processes carried out on the same machine can also be related to one another. For example, one process can be drilling a metal component and another process can be drilling a ceramic component. In general, two processes can be related to one another if the input variables of the respective processes overlap at least in part and the output variables of the respective processes overlap at least in part. Illustratively, two processes related to one another can have one or more identical input variables (e.g., a process temperature, a process time and/or a vacuum pressure in the case of heat treatment) and one or more identical output variables (e.g., a hardness, strength, density, microstructure, macrostructure and/or chemical composition in the case of heat treatment). Two processes are related to one another if their respective models are suitable for transfer learning.

The first system 100 can have a first control device 106. The first control device 106 can be configured to control the first device 108 in accordance with a respective (provided) first input parameter value 102 of at least one (i.e., exactly one or more than one) input variable. Illustratively, the first control device 106 can control an interaction of the first device 108 with the environment in accordance with the first input parameter value(s) 102. Because a respective first input parameter value 102 can be provided for each input variable (of the at least one input variable), these are also referred to below as at least one first input parameter value 102.

The term "control device" (also referred to as "controller") can be understood as any type of logical implementation unit that can include, for example, a circuit and/or a processor capable of executing software, firmware, or a combination thereof stored in a storage medium, and issue the instructions, e.g., to a device for carrying out a process in the present example. The control device can be configured, for example, by means of program code (e.g., software), to control the operation and/or setting (e.g., calibration) of a system, such as a production system, a processing system, a robot, etc.

An input parameter value as used herein can be a parameter value describing an input variable such as a physical or chemical variable, an applied voltage, an opening of a valve, etc. For example, the input variable can be a process-related property of one or more materials, such as hardness, thermal conductivity, electrical conductivity, density, microstructure, macrostructure, chemical composition, etc.

The first device 108 can be configured to carry out the other process related to the physical or chemical process in accordance with the at least one first input parameter value 102.

The first system 100 can have one or more first sensors 110. The one or more first sensors 110 can be configured to detect a result of the process. A result of the process can, for example, be a property of a produced product or machined workpiece (e.g., a hardness, strength, density, microstructure, macrostructure, chemical composition, etc.), a success or failure of a skill (e.g., picking up an object) of a robot, a resolution of an image recorded by means of a camera, etc. The result of the process can be described by means of at least one (i.e., exactly one or more than one) output variable. The one or more first sensors 110 can be configured to detect a first output value 112 of the at least one output variable. For example, a respective first output value 112 can be acquired for each output variable of a plurality of output variables. Because a respective first output value 112 can be detected for each output variable (of the at least one output variable), these are also referred to below as at least one first output value 112.

The detection of a result of a process by means of one or more sensors as described herein can take place while the process is carried out (e.g., in situ) and/or after the process is carried out (e.g., ex situ). For example, the model can describe the relationship between one or more input variables and at least two output variables, it being possible to detect an output value of an output variable of the at least two output variables during the process and an output value of the other output variable of the at least two output variables after the process has been carried out. As an illustrative example of detecting the output value after the process is carried out, the process can be hardening a workpiece in a furnace with a temperature as an input variable. In this case, the output variable can be a hardness of the workpiece at room temperature after the hardening process.

An output value as used herein can be a value describing an output variable of the process. An output variable of the process can be a property of a product, workpiece, recorded image or another result. However, an output variable of the process can also be a success or failure (e.g., of a skill of a robot). Illustratively, the at least one first output value 112 can result from the at least one first input parameter value 102. The output variable can have an application-specific quality criterion. The output variable can be a component-related parameter, such as a measure or a layer thickness, or can be a material-related parameter, such as hardness, thermal conductivity, electrical conductivity, density, chemical composition, etc.

The at least one first input parameter value 102 and the at least one first output value 112 can form a first measurement point 130. The first control device 106 can be configured to control the first device 108 one after the other for an (e.g., different) input parameter value of the at least one input variable. The one or more first sensors 110 can detect a respective at least one first output value 112. Illustratively, a plurality of first measurement points can be determined. The determined first measurement points are also referred to as known first measurement points, $D_{s(2)}$ (i.e., $D_s$ or $D_{s2}$).

The known first measurement points, $D_{s(2)}$, can be described by equation (1):

$$D_{s(2)} = \{(x_{s(2),i}, y_{s(2),i})\}_{i=1:N_{s(2)}} \qquad (1),$$

where $N_{s(2)}$ is the number of known first measurement points, $x_{s(2),i}$ is the at least one input parameter value 102 of the respective known first measurement point, i, and $y_{s(2),i}$ is the at least one output value 112 of the respective known first measurement point, i.

The first system 100 can have a memory device having at least one memory. The known first measurement points, $D_{s(2)}$, are stored or can be stored in the memory. The memory can be used in the processing carried out by a processor.

A memory used in the embodiments can be a volatile memory, for example a DRAM (dynamic random-access memory), or a non-volatile memory, for example a PROM (programmable read-only memory), an EPROM (erasable PROM), an EEPROM (electrically erasable PROM), or a flash memory such as a floating-gate memory device, a charge-trapping memory device, an MRAM (magnetoresistive random-access memory), or a PCRAM (phase-change random-access memory).

In various embodiments, training or learning of a model is described herein (see, for example, algorithms 1, 2, 4 and 5). When a model is trained or learned, an a priori model (also referred to as a priori of the model) can be defined. This a priori model can illustratively exist without data (e.g., without known measurement points). The model can have hyperparameters that determine the general properties of the distributions described by the model. When the model is trained or learned, optimization of the hyperparameters of the model (also referred to as hyperparameter optimization) can be carried out. The hyperparameter optimization of the model can take place based on known (e.g., measured and/or simulated) measurement points. The model having optimized hyperparameters can also be referred to as a hyperparameter-optimized model. Illustratively, the hyperparameters can be adapted with the help of the known measurement points. For example, if it is apparent from the known measurement points that, when the input parameter values are changed, the output values vary comparatively greatly, the model can be adapted, for example, to the effect that functions that vary faster are more probable. When the model is trained or learned, an a posteriori model (also referred to as a posteriori of the model) can also be determined by conditioning the model (for example, the hyperparameter-optimized model) on the known measurement points. In this case, the a posteriori distribution of the random variables, which depends on the hyperparameters, can be determined (e.g., calculated). The hyperparameters can remain unchanged in this case. According to various embodiments, the values of the hyperparameters can be optimized based on the known measurement points. According to various embodiments, at least one first model and one second model can be trained or learned (see, for example, algorithms 1, 2, 4 and 5). According to various embodiments, the second model can be learned on the basis of the first model and, when the second model is trained or learned, previously optimized hyperparameters of the first model can remain unchanged.

If a learned or trained a posteriori model is adapted to new measurement points, both hyperparameter optimization and conditioning, as described above, can be carried out.

According to various embodiments, a first a posteriori model 114 (also referred to as a posteriori model of the first model) can be determined using the known first measurement points, $D_{s(2)}$. The first a posteriori model 114 can describe a relationship between the at least one input variable and the at least one output variable of the other process. Illustratively, by means of the first a posteriori model 114, an associated expected output value can be determined for an input parameter value and the probability density of the association with an input parameter value can be determined for an output value, even if the input parameter value or the output value is not part of the known first measurement points. Subsequently, for example, the input value having the highest probability density can then be selected. Illustratively, the first a posteriori model 114 describes the other process.

Figure 1B:
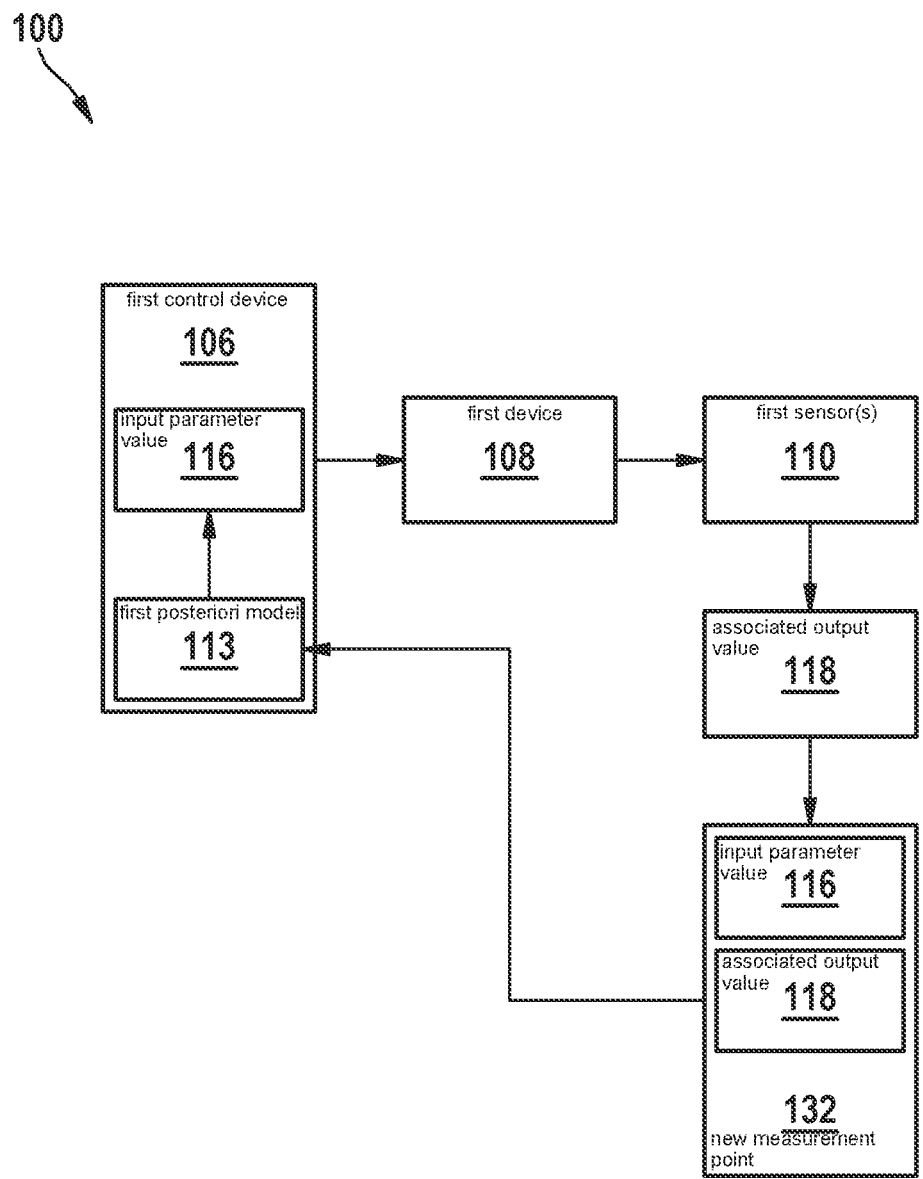

The known first measurement points, $D_{s(2)}$, can be measured by a user selecting at least one first input parameter value 102 for each first measurement point. However, it is also possible to measure a subset of the known first measurement points, $D_{s(2)}$. As shown in FIG. 1B, a preliminary first a posteriori model 113 can be determined for the subset of the known first measurement points, $D_{s(2)}$. The preliminary first a posteriori model 113 can describe a relationship between the at least one input variable and the at least one output variable of the other process for the subset of the known first measurement points, $D_{s(2)}$. According to various embodiments, the first control device 106 can be configured to use an acquisition function (e.g., according to reference [2] and/or reference [3]) to determine at least one input parameter value 116 (also referred to as a new input parameter value) for a new measurement point 132. The first control device 106 can control the first device 108 according to the determined at least one input parameter value 116, and the one or more first sensors 110 can detect the associated output value 118 of the new measurement point 132. By way of example, one or more of the known first measurement points, $D_{s(2)}$, can be determined in this way. In this case, the preliminary first a posteriori model 113 can be adapted on the basis of the determined new measurement points in order to determine the first a posteriori model 114. The first a posteriori model 114 can consequently describe the relationship between the at least one input variable and the at least one output variable for all known first measurement points, $D_{s(2)}$, of the other process.

However, the known first measurement points, $D_{s(2)}$, can also be determined by means of a simulation. In this case, the system 100 can have a computer. In a first example, the simulation can comprise both determination of the input parameter value 116 for the new measurement point 132 and simulation of the physical or chemical process. The first control device 106, the first device 108 and the one or more first sensors 110 are not necessary in this case of the first example. In a second example, the simulation may include merely the simulation of the physical or chemical process. In the case of the second example the first control device 106 can, for example, further determine the input parameter value 116 for the new measurement point 132, and the first device 108 and one or more first sensors 110 are not necessary. The computer can use the memory during processing. As described above, the computer can be any type of circuit, i.e., any type of logic-implementing entity. The computer can be configured to simulate the other process and thus to determine an associated at least one output value 112 several times for at least one input parameter value 102. Illustratively, the output values of the known first measurement points, $D_{s(2)}$, can be simulated instead of measured.

Figure 1C:
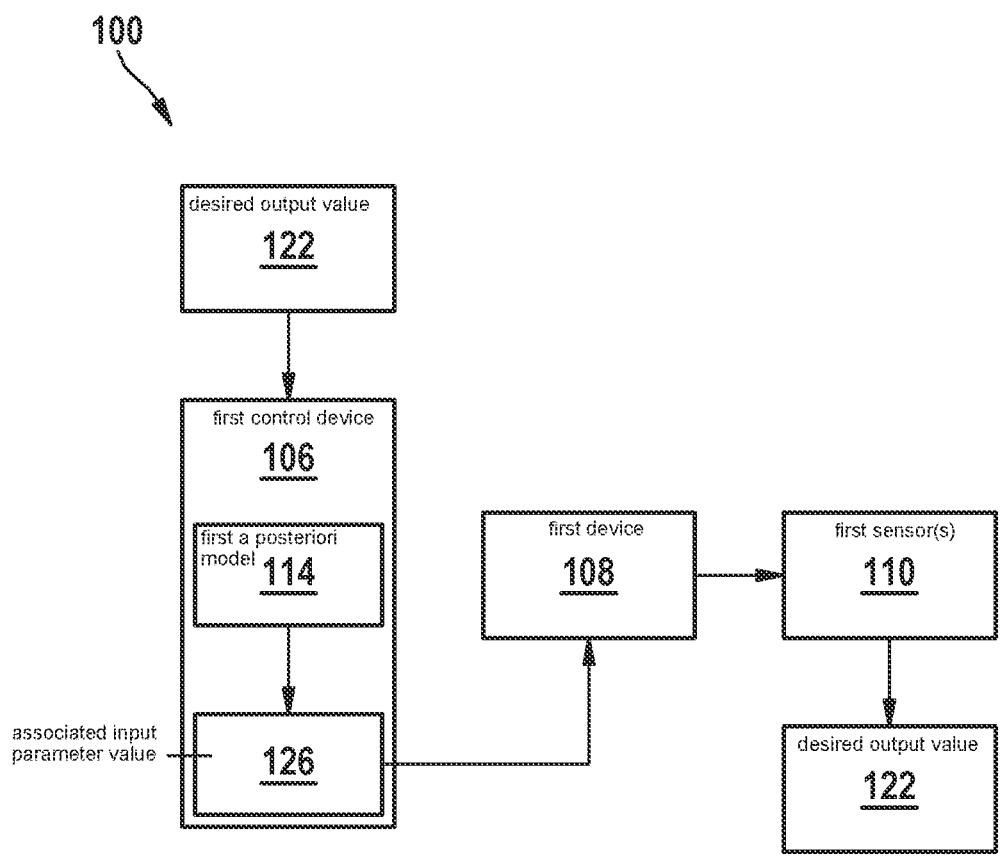
FIG. 1C shows controlling the first device in accordance with the learned first a posteriori model according to various example embodiments.

FIG. 1C shows controlling the first device 108 in accordance with the learned first a posteriori model 114 according to various embodiments. For example, an associated input parameter value 126 of the at least one input variable can be determined by means of the first a posteriori model 114 on the basis of a desired output value 122 of the at least one output variable of the other process. The first control device 106 can be configured to control the first device 108 in accordance with the determined input parameter value 126. Optionally, the one or more first sensors 110 can detect the output value, which can substantially correspond to the desired output value 122.

Figure 2A:
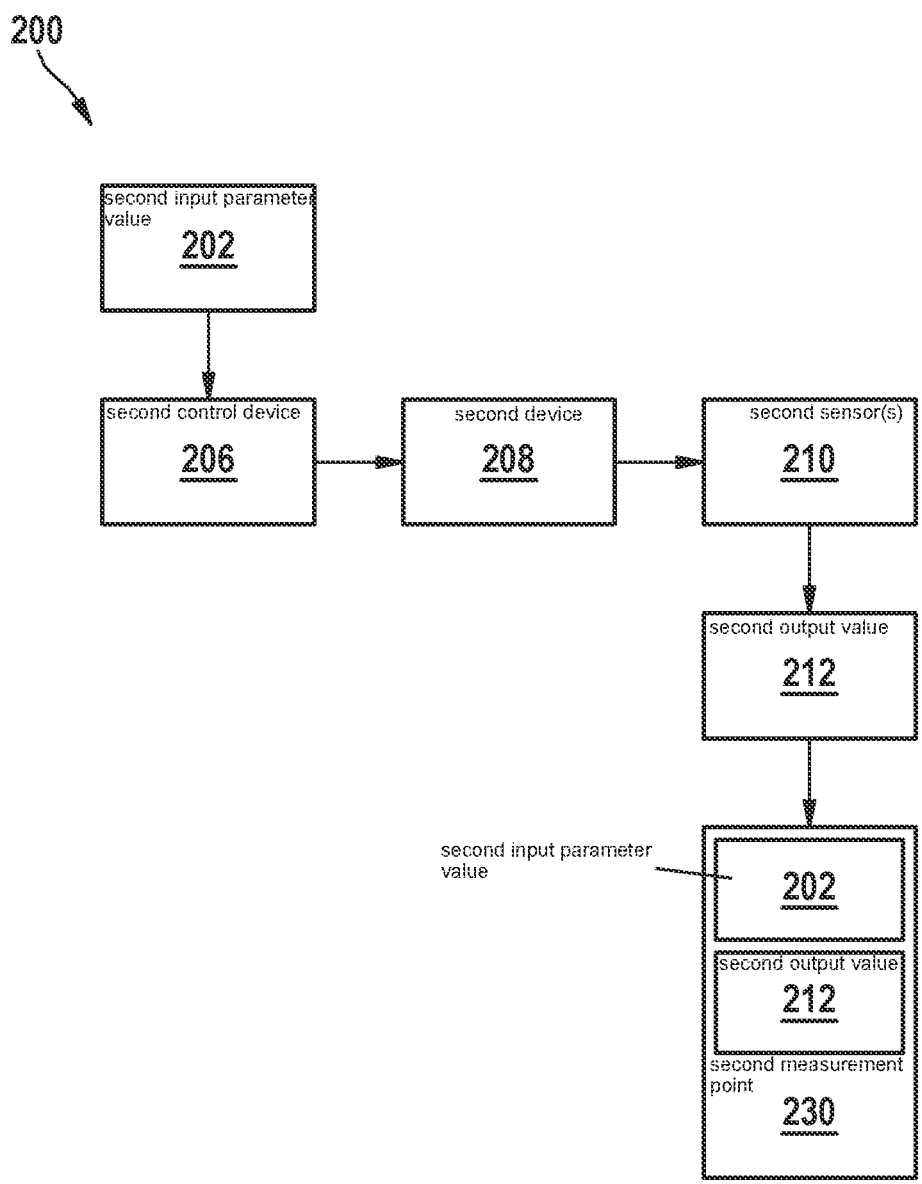
FIG. 2A shows carrying out a physical or chemical process by means of a second device according to various example embodiments of the present invention.

FIG. 2A shows a second system 200 having the second device 208, which can carry out the physical or chemical process.

The second system 200 can be similar to the first system 100. Thus, the second system 200 can have a second control device 206 and one or more second sensors 210. The second control device 206 can be configured to control the second device 208 in accordance with a respective (provided) second input parameter value 202 of at least one (i.e., exactly one or more than one) input variable. Illustratively, the second control device 206 can control an interaction of the second device 208 with the environment in accordance with the second input parameter value(s) 202. Because a respective second input parameter value 202 can be provided for each input variable (of the at least one input variable), these are also referred to below as at least one second input parameter value 202. The second device 208 can be configured to carry out the physical or chemical process in accordance with the at least one second input parameter value 202.

The one or more second sensors 210 can be configured to detect a result of the physical or chemical process. A result of the physical or chemical process can, as described by way of example with respect to FIG. 1A, be a property of a produced product or machined workpiece (e.g., a hardness, strength, density, microstructure, macrostructure, chemical composition, etc.), a success or failure of a skill (e.g., picking up an object) of a robot, a resolution of an image recorded by means of a camera, etc. The result of the process can be described by means of at least one (i.e., exactly one or more than one) output variable. For example, a result of the other process can be described by means of a plurality of first output variables, and a result of the physical or chemical process by means of a plurality of second output variables. In this case, the plurality of first output variables can have one or more (e.g., all) of the second output variables, or vice versa. For example, one or more output variables of the plurality of first output variables and the plurality of second output variables can match. The result can be determined, as described with respect to the one or more sensors 110, during the physical or chemical process or subsequent thereto.

The one or more second sensors 210 can be configured to detect a second output value 212 of the at least one output variable. For example, a respective second output value 212 can be detected for each output variable of a plurality of output variables. The at least one second input parameter value 202 and the at least one second output value 212 can form a second measurement point 230. According to various embodiments, a plurality of second measurement points can be determined as known second measurement points, $D_t$.

The known second measurement points, $D_t$, can be described by equation (2):

$$D_t = \{(x_{t,i}, y_{t,i})\}_{i=1:N_t} \quad (2),$$

where $N_t$ is the number of known second measurement points, $x_{t,i}$ is the at least one input parameter value 202 of the respective known second measurement point, i, and $y_{t,i}$ is the at least one output value 212 of the respective known second measurement point, i.

Similarly to the first system 100, the second system 200 can have a memory device having at least one memory for storing the known second measurement points, $D_t$.

Both the first a posteriori model 114 and the second a posteriori model 214 can have uncertainty with respect to the accuracy of the at least one output variable and thus the accuracy of the respective model for a certain at least one input variable. These uncertainties are dependent on the known measurement points. The prediction of the respective model can have both an expected value and a measure of the uncertainty with respect to this expected value. Thus, a prediction of the respective model can have a distribution (e.g., normal distribution) of values for each output value. Illustratively, an a posteriori model can describe a relationship between an input variable and an output variable for known measurement points, the regions between known measurement points also being predicted. It is understood that these predicted regions have a certain uncertainty and that the more measurement points are present, the more uncertainty can be reduced. These uncertainties can be of great importance, for example, if there are only a few measurement points. It is understood that due to noise and/or disturbances, each measurement point can also have an uncertainty.

According to various embodiments, a second a posteriori model 214 can be determined by taking into account the first a posteriori model 114 and the known second measurement points, $D_t$. According to various embodiments, when the second a posteriori model 214 is determined, both the uncertainties of the first a posteriori model 114 with respect to the known first measurement points, $D_{s(2)}$, and the uncertainties of the second a posteriori model 214 with respect to the known second measurement points, $D_t$, are taken into account. In this case, the uncertainties of the first a posteriori model can be of great importance at measuring locations (i.e., input parameter values of the one or more input variables) where there are no measured first output values.

In the following, two concepts (also referred to as approaches) are described by means of which the uncertainties of both a posteriori models 114, 214 can be taken into account. According to various embodiments, the system 200 can have a computer configured to determine the second a posteriori model 214.

I) First Concept for Determining the Second a Posteriori Model 214 (Also Referred to as a Sequential Hierarchical Gaussian Process):

The first a posteriori model 114 can have a first a posteriori probability distribution, $p(f_{s(2)}|D_{s(2)})$.

The computer can be configured to, on the basis of the first a posteriori probability distribution, $p(f_{s(2)}|D_{s(2)})$ (e.g., $(f_s|\mathcal{D}_s)$ determine a Gaussian process by drawing a function $(\tilde{f}_s|D_s)$ from the first a posteriori probability distribution, $p(f_s|\mathcal{D}_s)$ (and thus from the first a posteriori model 114). This function can be randomly drawn from the first a posteriori probability distribution, $p(f_s|\mathcal{D}_s)$, wherein the term "randomly" may indicate that the function is dependent on the probabilities of the first a posteriori probability distribution, $p(f_s|\mathcal{D}_s)$. This function can be an exemplary expected value function of the second a posteriori model 214. In this way, the computer can determine a plurality of Gaussian processes by drawing an a priori expectation value function, $\tilde{f}_s$, from the first a posteriori model 114 for each Gaussian process. According to various embodiments, each Gaussian process of the plurality of Gaussian processes has the same common covariance function, $k_t$. As a result, each Gaussian process of the plurality of Gaussian processes can be described as $GP((\tilde{f}_s|D_s),k_t)$, it being possible for the a priori expected value functions $(\tilde{f}_s|D_s)$ of the plurality of Gaussian processes to be different from each other.

The computer can be configured to determine a second a priori model, $f_t$, (also referred to as a priori of the second model) as a mean value of the plurality of Gaussian processes, $GP((\tilde{f}_s|D_s),k_t)$ (e.g., by means of Bayesian model averaging). The second a priori model, $f_t$, can, as the expected value function, have a mean value of the expected value functions, $E(\tilde{f}_s|D_s)$, of the plurality of Gaussian processes. Because the expected value functions, $\tilde{f}_s$, of the plurality of Gaussian processes can be different from each other, the averaged second a priori model, $f_t$, can have a covariance function that has both the common covariance, $k_t$, and another covariance that describes the variance of the expected value functions, $\tilde{f}_s$, of the plurality of Gaussian processes. Said other covariance is accordingly dependent on the first a posteriori probability distribution, $p(\tilde{f}_s|\mathcal{D}_s)$, and thus on the uncertainty of the first a posteriori model 114. Illustratively, the covariance function of the second a priori model, $f_t$, describes an uncertainty of the first a posteriori model 114 in addition to the covariance $k_t$. The averaged Gaussian process of the second a priori model, $f_t$, can be described as $f_t \sim \mathcal{GP}[\mathbb{E}(f_s|\mathcal{D}_s), cov(f_s|\mathcal{D}_s)+k_t]$, $cov(f_s|\mathcal{D}_s)$ being the other covariance. The other covariance can be the covariance function of a Gaussian process of the first a posteriori model 114.

The computer can be configured to determine the second a posteriori model 214 (also referred to as a posteriori of the second model) by conditioning the second a priori model, $f_t$, on the known second measurement points, $D_t$. The second a posteriori model 214 can have a second a posteriori probability distribution, $p(f_t|\mathcal{D}_t)$.

In general, an a priori model of a model can be a prior belief prior to the conditioning of the model on known measurement points. The prior belief of the a priori model can be described as a Gaussian process $\mathcal{GP}$ (m,k) having an expected value function, m(·), and a covariance function (also referred to as kernel function), $k(\cdot,\cdot)$. An associated a posteriori model can be determined by conditioning the a priori model on the known measurement points. The a posteriori model can have an a posteriori probability distribution as a Gaussian process having an associated a posteriori expected value function and associated a posteriori covariance function at an evaluation value point, $X_*$, of the a posteriori model. In general, the covariance between two points can be defined. In particular, these two points can also be the same point. The a posteriori expected value function of the Gaussian process at an evaluation value point, $X_*$, is indicated by way of example for the conditioning of the second a priori model, $f_t$, on the known second measurement points, $D_t$, in equation (3) and for the associated a posteriori covariance function in equation (4):

$$E(f_t|x_*,\mathcal{D}_t) = m(x_s) + k(x_*,X_t)(k(X_t,X_t)+\sigma_t^2 \mathbb{1})^{-1}(y_t - m(X_t)) \quad (3),$$

$$\text{cov}(f_t|x_*,\mathcal{D}_t) = k(x_*,x_*) - k(x_*,X_t)(k(X_t,X_t)+\sigma_t^2 \mathbb{1})^{-1}k(X_t, x_*) \quad (4),$$

where $X_t = (x_1, \ldots, x_{N_t})$ are the input parameter values 202, $x_{t,i}$ (where $i=1$ to $i=N_t$) of the known second measurement points and $y_t = (y_1, \ldots, y_{N_t})$ is the respective associated output value 212, $y_{t,i}$. Each output value 212, $y_{t,i}$, can be described by a normal distribution with an expected value $E(f_t|x_{t,i},D_t)$ and variance $\text{cov}(f_t|x_{t,i},D_t)+\sigma_t^2$. By way of analogy, in accordance with equations (3) and (4), the first a posteriori model 114 can be determined by conditioning a first a priori model, $f_s$, on the known first measurement points, $D_s$.

The covariance function of the second a posteriori model 214 can be described on the basis of a covariance function, $k_s$, (also referred to as a first kernel function) of the first a posteriori model and the common covariance function, $k_t$, (also referred to as the second kernel function or common covariance function of the plurality of Gaussian processes). A common covariance function of the first and second models can be described according to equation (5):

$$\begin{bmatrix} k((x,s),(x',s)) & k((x,s),(x',t)) \\ k((x,t),(x',s)) & k((x,t),(x',t)) \end{bmatrix} = \begin{bmatrix} k_s(x,x')+\sigma_s^2 & k_s(x,x') \\ k_s(x,x') & k_s(x,x')+k_t(x,x')+\sigma_t^2 \end{bmatrix}. \quad (5)$$

In this case, both the first a priori model and the second a priori model can be determined by taking into account the first kernel function, $k_s$. The covariance function of the second a priori model can be determined as the sum of the first a posteriori covariance function, $\text{cov}(f_s|\mathcal{D}_s)$, and the second kernel function, $k_t$. In the case of transfer learning, the second a priori model, $f_t$, can be learned as a difference from the first a posteriori model. This difference takes into account the uncertainty of the first a posteriori model (see equation (5)).

According to various embodiments, this difference can be learned with increased efficiency and can result in faster convergence when a model is learned and when a process is optimized by means of Bayesian optimization (compared to transfer learning where the uncertainty of the previous model is not taken into account).

In Bayesian optimization, hyperparameters of the kernel functions (e.g., the first kernel function and/or the second kernel function) can be adapted (also referred to as hyperparameter optimization). For example, hyperparameters of the first a priori model can be adapted (e.g., optimized) in such a way that the probability of the known first measurement points, $D_s$, being described by said first a priori model is increased (e.g., is at a maximum). For example, hyperparameters of the second a priori model can be adapted (e.g., optimized) in such a way that the probability of the known second measurement points, $D_t$, being described by said second a priori model is increased (e.g., is at a maximum). In this case, the hyperparameters of the first a priori model can be kept constant. By setting the hyperparameters of the first kernel function, $k_s$, the uncertainty of the first a posteriori model 114 during conditioning of the second a priori model on the known second measurement points can be maintained.

According to various embodiments, the second a posteriori model 214 can be determined by taking into account the first a posteriori model 114 on the basis of the known first measurement points, $D_s$, the known second measurement points, $D_t$, the first kernel function, $k_s$, and the second kernel function, $k_t$, in accordance with algorithm 1:

Algorithm 1: Learning the second a posteriori model 214 in accordance with the first concept Input: $D_s$, $D_t$, $k_s$, $k_t$.
Output: $P(f_t|\mathcal{D}_t)$.

1. Define a first a priori model (e.g., as $f_s \sim \mathcal{GP}[0,k_s]$ if the known first measurement points were previously standardized).
2. Optimize hyperparameters of the first model such that the probability of the known first measurement points $D_s$ being described by means of said first model is at a maximum.
3. Determine a first a posteriori model 114 by conditioning the first model, $f_s$, using the optimized hyperparameters, on the known first measurement points, $D_s$, using equations (3) and (4) (which are formulated for the second a posteriori model, but analogously for the first a posteriori model).
4. Define a second a priori model:

$$f_t \sim \mathcal{GP}[E(f_s|\mathcal{D}_s), \text{cov}(f_s|\mathcal{D}_s)+k_t].$$

5. Optimize hyperparameters of the second model such that the probability of the known second measurement points $D_t$ being described by said model is at a maximum. (The hyperparameters of the first model are kept constant in this step.)
6. Determine a second a posteriori model 214 by conditioning the second model, $f_t$, using the optimized hyperparameters of the second model, on the known second measurement points, $D_t$, using equations (3) and (4).

In this case, the second a priori model (in 3. in algorithm 1) can be defined by determining the second a priori model, $f_t$, as a mean value of the plurality of Gaussian process, $GP((\bar{f}_s|D_s),k_t)$ as described above.

As described above, the hyperparameters of the first kernel function, $k_s$, can remain unchanged. Illustratively, the second a posteriori model 214 can be learned by means of Bayesian optimization by only carrying out point 4 of the algorithm 1 for new measurement points.

The transmission of the uncertainty (also referred to as propagation of the uncertainty) of the first a posteriori model 114 to the second a priori model and also to the second a posteriori model increases both the data efficiency and the optimization efficiency because the amount of measurement data required can be reduced and, as a result, an expenditure (e.g., time expenditure and/or outlay) for learning of the model can be reduced.

II) Second Concept for Determining the Second a Posteriori Model 214 (Also Referred to as an Amplified Hierarchical Gaussian Process):

Analogously to the first concept, in the second concept the plurality of Gaussian processes having the common covariance function, $k_t$, can be determined in accordance with $GP((\tilde{f}_s|D_s),k_t)$ Differences in the expected value functions, $\tilde{f}_s$, of the plurality of Gaussian processes, $GP((\tilde{f}_s|D_s),k_t)$, can characterize the uncertainty of the first a posteriori model. In contrast to the first concept, in the second concept each Gaussian process of the plurality of Gaussian processes, $GP((\tilde{f}_s|D_s),k_t)$, can in each case be conditioned on the known second measurement points, $D_t$, in accordance with equations (3) and (4). According to various embodiments, the second a posteriori model can be determined as a mean value of the conditioned plurality of Gaussian processes. The differences between the expected value functions, $\tilde{f}_s$, and the plurality of Gaussian processes, $GP((\tilde{f}_s|D_s),k_t)$ in this case directly influence the covariance function of the second a posteriori model such that the covariance function of the second a posteriori model also takes into account the uncertainty of the first a posteriori model.

The common kernel function of both models can be described on the basis of the first kernel function, $k_s$, of the first a posteriori model and the second kernel function, $k_t$, in accordance with equation (6):

$$\begin{bmatrix} k((x,s),(x',s)) & k((x,s),(x',t)) & k((x,s),(x',*)) \\ k((x,t),(x',s)) & k((x,t),(x',t)) & k((x,t),(x',*)) \\ k((x,*),(x',s)) & k((x,*),(x',t)) & k((x,*),(x',*)) \end{bmatrix} = \begin{bmatrix} k_s(x,x') + \sigma_s^2 & 0 & 0 \\ 0 & k_t(x,x') + \sigma_t^2 & 0 \\ 0 & 0 & k_t(x,x') + \sum_*^{boost} \end{bmatrix}, \quad (6)$$

where "*" denotes the evaluation points and where $\Sigma_*^{boost}$ is an additional covariance term that describes the uncertainty boost transferred from the first a posteriori model $\Sigma_*^{boost}$ can be described in accordance with equation (7):

$$\Sigma_*^{boost} = \Sigma_{*,*}^s + \alpha_{*,t} \Sigma_{t,t}^s \alpha_{*,t}^T - \alpha_{*,t} \Sigma_{t,*}^s - \Sigma_{*,t}^s \alpha_{*,t}^T \quad (7),$$

where $\alpha_{*,t} = k_t(x_*, X_t)(k_t(X_t, X_t) + \sigma_t^2 \mathbb{1})^{-1}$ and where and where $\Sigma_{t,t}^s, \Sigma_{t,*}^s, \Sigma_{*,t}^s, \Sigma_{*,*}^s$ are the blocks of the covariance matrix of the first a posteriori model, which blocks are evaluated at the known second measurement points and the evaluation points.

The second a posteriori model 214 can be learned in accordance with algorithm 2.

Algorithm 2: Learning the second a posteriori model in accordance with the second concept Input: $D_s$, $D_t$, $k_s$, $k_t$.

Output: $p(f_t|\mathcal{D})$

1. Define a first a priori model (e.g., as $f_s \sim \mathcal{GP}[0,k_s]$ if the known first measurement points were previously standardized).
2. Optimize hyperparameters of the first model such that the probability of the known first measurement points $D_s$ being described by means of said first model is at a maximum.
3. Determine a first a posteriori model 114 by conditioning the first model, $f_s$, using the optimized hyperparameters, on the known first measurement points, $D_s$, using equations (3) and (4) (which are formulated for the second a posteriori model, but analogously for the first a posteriori model).
4. Define a second a priori model: $f_t \sim \mathcal{GP}[\mathbb{E}(f_s|\mathcal{D}_s), k_t]$.
5. Optimize hyperparameters of the second model such that the probability of the known second measurement points $D_t$ being described by said model is at a maximum. (The hyperparameters of the first a priori model are kept constant in this step.)
6. Determine a second a posteriori model 214 by conditioning the second model, $f_t$, using the optimized hyperparameters, on the known second measurement points, $D_t$, using equations (3), (4) and by adding the additional covariance term in accordance with equation (7).

Figure 2B:
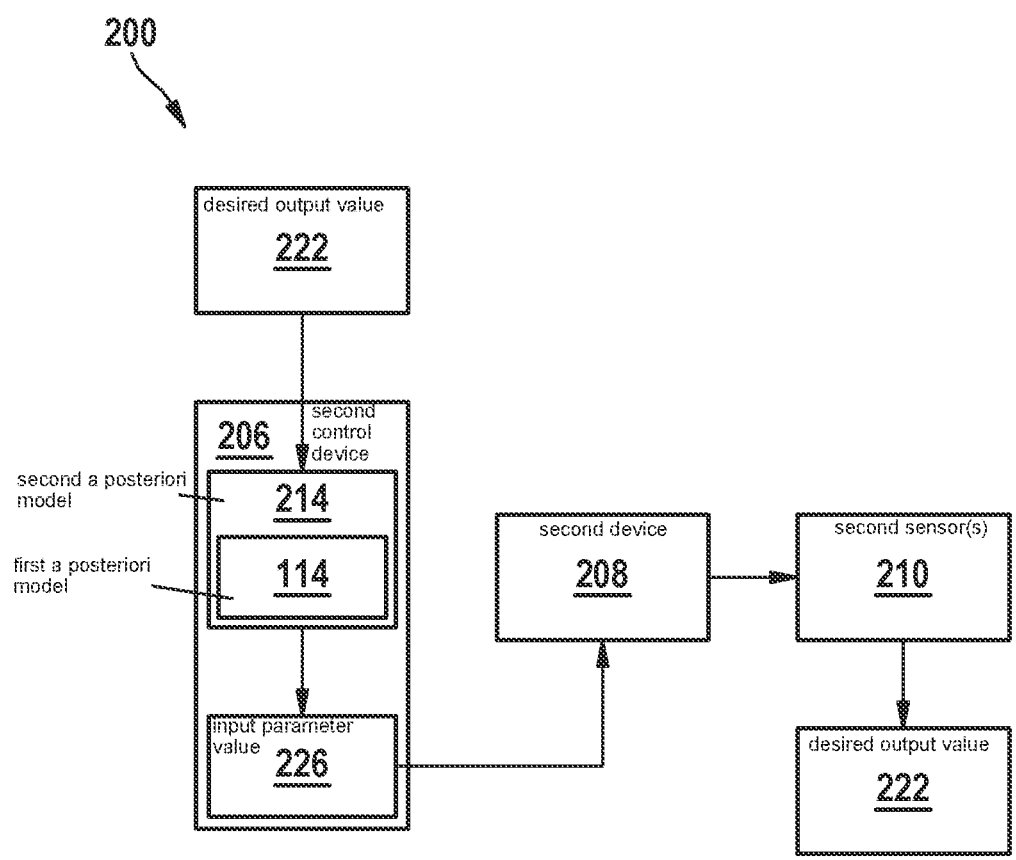
FIG. 2B shows controlling the second device in accordance with the learned second a posteriori model according to various example embodiments of the present invention.

FIG. 2B shows controlling the second device 208 in accordance with the learned second a posteriori model 214 according to various embodiments. The second control device 206 can provide a desired output value 222 of the at least one output variable. Alternatively, the control device 206 can determine the desired output value on the basis of other parameter values and/or settings. The control device 206 can be configured to determine the input parameter value 226 of the at least one input variable that is assigned to the desired output value 222 in accordance with the second a posteriori model 214. The control device 206 can control the second device 208 in accordance with the determined input parameter value of the at least one input variable in order to carry out the physical or chemical process. Optionally, the one or more second sensors 210 can detect the output value, which can substantially correspond to the desired output value 222.

Figure 2C:
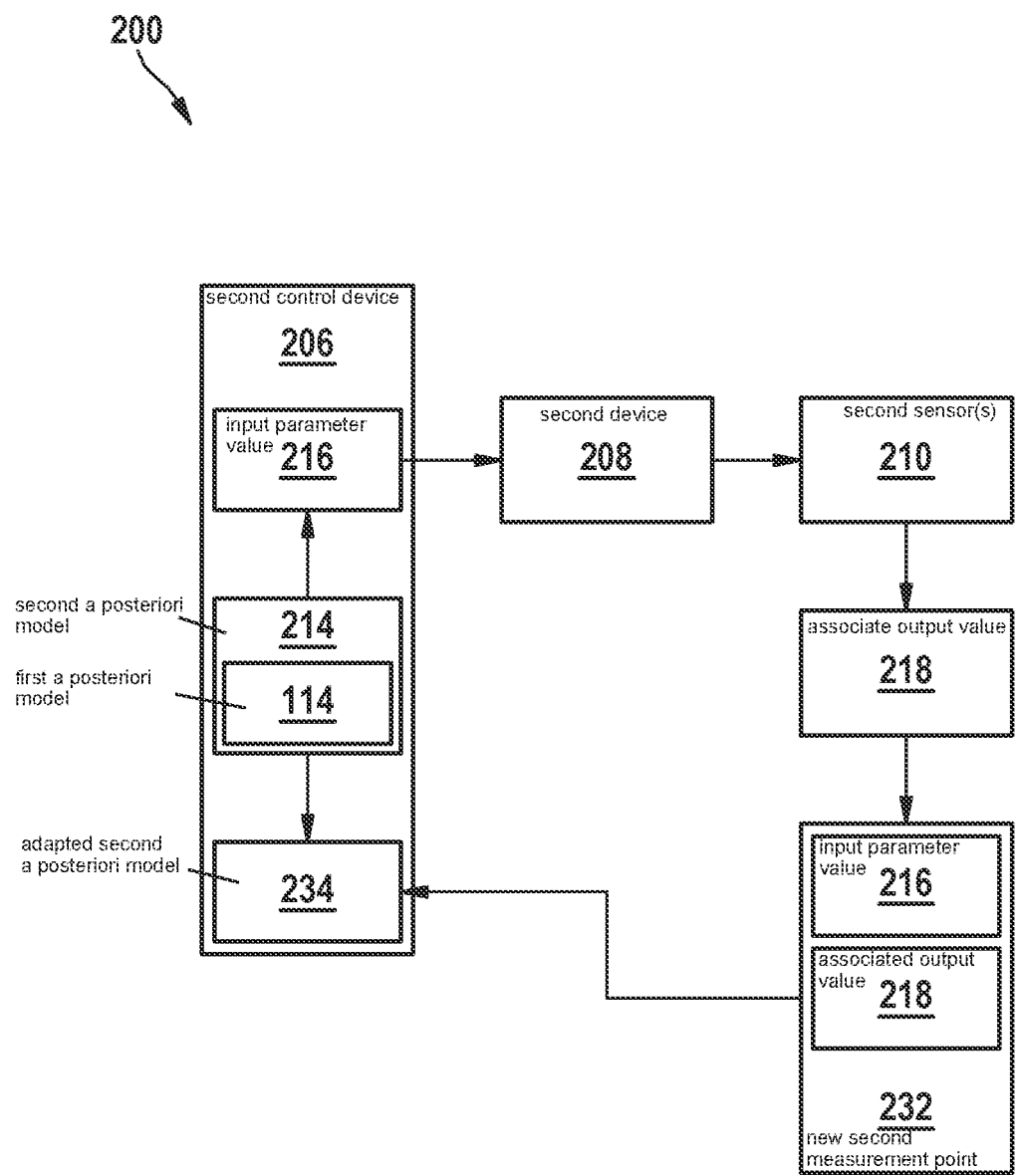
FIG. 2C shows adapting the second a posteriori model according to various example embodiments of the present invention.

FIG. 2C shows adapting the second a posteriori model 214 according to various embodiments. According to various embodiments, the second a posteriori model 214 can be adapted by means of Bayesian optimization. In this case, additional second measurement points can be determined by means of Bayesian optimization, and the second a posteriori model 214 can additionally be conditioned on the additional second measurement points. A new second measurement point can be selected on the basis of the second a posteriori model 214 by means of an acquisition function $\alpha(f_t|D_t)$ (e.g., an acquisition function according to reference [2] and/or reference [3]), for example in accordance with equation (8):

$$x_{N_t+1} = \underset{x \in D}{\operatorname{argmax}} \alpha(f_t | x, \mathcal{D}_t), \quad (8)$$

where D is all allowed values of the at least one input variable. Illustratively, the input parameter value, $X_{N_t}+1$, of the at least one input variable can be determined and the associated output value can be measured. The determined input parameter value, $x_{N_t}+1$, and the measured output value can form the new second measurement point.

For example, the control device 206 can select an input parameter value 216 of a new second measurement point 232 by means of the acquisition function. The control device 206 can control the second device 208 according to the determined input parameter value 216, and the one or more second sensors 210 can detect the associated output value 218 of the new second measurement point 232. According to various embodiments, the second a posteriori model 214 can additionally be conditioned on the new second measurement point 232. Said adapted second a posteriori model 234 can describe the relationship between the at least one input variable and the at least one output variable at the previously known second measurement points, $D_t$, and the new second measurement point 232. Illustratively, the known second measurement points, $D_t$, can also have the new second measurement point 232. In this way, new second measurement points can be determined as often as desired, and the respective second a posteriori model can be conditioned in each iteration on the new known second measurement points. In this case too, the hyperparameters of the first kernel function, $k_s$, can remain unchanged in the first and in the second concept. This can increase the efficiency of Bayesian optimization. It is understood that explicitly determining the plurality of Gaussian processes is not required, but that the effective formula that describes the limit of infinitely many such Gaussian processes can be evaluated. Said effective formula can be evaluated, for example, if the hyperparameters of the second a posteriori model are again optimized on the basis of new measurement points.

The determination of a new second measurement point and the adaptation of the second a posteriori model can be described in accordance with algorithm 3:

Algorithm 3: Bayesian optimization of the second a posteriori model 214
for i←1, 2, . . . do the following:
1. Find the input parameter value $x_i$ by optimizing the acquisition function via the second a posteriori model $$x_i = \mathrm{argmax}_x \alpha(f_t|x, \mathcal{D}_t).$$

2. Determine the output value $y_i = y_i(x_i)$ associated with the input parameter value $x_i$.
3. Add the new measurement point $(x_i, y_i)$ to the known second measurement points, $D_t = \mathcal{D}_t \leftarrow \{\mathcal{D}_t, (x_i, y_i)\}$.
4. Adapt the second a posteriori model on the basis of the known second measurement points, $D_t$.

End for

Figure 2D:
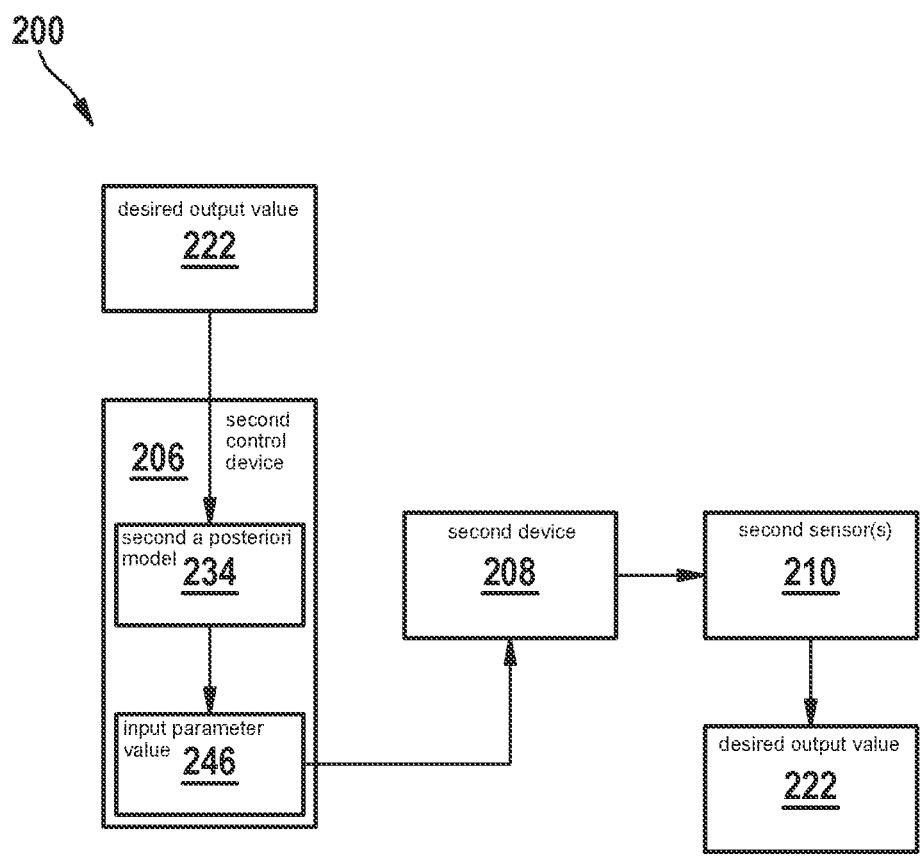
FIG. 2D shows controlling the second device in accordance with the adapted second a posteriori model according to various example embodiments.

FIG. 2D shows controlling the second device 208 in accordance with the adapted second a posteriori model 234 according to various embodiments. This can take place in a manner similar to the controlling of the second device 208 described with reference to FIG. 2B. The second control device 206 can be provided with the desired output value 222 of the at least one output variable, and the control device 206 can determine an input parameter value 246 of the at least one input variable which is assigned in accordance with the adapted second a posteriori model 234. The control device 206 can control the second device 208 in accordance with the determined input parameter value 246 of the at least one input variable in order to carry out the physical or chemical process.

According to various embodiments, the second a posteriori model can be learned sequentially on the basis of a plurality of other models. Illustratively, the first a posteriori model can be learned on the basis of yet another a posteriori model (referred to below as the third a posteriori model) before the first a posteriori model is used to learn the second a posteriori model. Said other a posteriori model could again have been learned on the basis of yet another a posteriori model.

For example, a third a posteriori model can describe the relationship between at least one input variable and at least one output variable of yet another process related to the physical or chemical process. The first a posteriori model can be determined by taking into account the third a posteriori model in accordance with algorithm 1 or algorithm 2, as described above for determining the second a posteriori model by taking into account the first a posteriori model. The third a posteriori model is determined or can be determined on the basis of known third measurement points, $D_{s(1)}$. As described herein, known measurement points, such as the known third measurement points, can also be determined by means of a simulation.

As an illustrative example of such transfer learning, the known third measurement points can be determined from a simulation, and the third a posteriori model can describe this relationship; the known first measurement points can be measured in a laboratory on an experiment device that is similar to a production system, and the first a posteriori model can describe this relationship; the known second measurement points can be measured on the production system and the second a posteriori model can describe the relationship between input variable(s) and output variable(s) of the production system.

According to various embodiments, the second a posteriori model 214 can be learned sequentially for a number of $n_s$ other models. In this case, any other model can be determined by taking into account the respective previous other model, as described herein for learning the second a posteriori model by taking into account the first a posteriori model. Illustratively, the second a posteriori model 214 can be considered as a stack of $n_s$ Gaussian processes stacked one above the other.

With regard to the first concept, the common kernel function of all models can be described in accordance with equation (9):

$$\begin{bmatrix} k((x, s_1), (x', s_1)) & k((x, s_1), (x', s_2)) & \ldots & k((x, s_1), (x', t)) \\ k((x, s_2), (x', s_1)) & k((x, s_2), (x', s_2)) & \ldots & k((x, s_2), (x', t)) \\ \vdots & \vdots & \ddots & \vdots \\ k((x, t), (x', s_1)) & k((x, t), (x', s_2)) & \ldots & k((x, t), (x', t)) \end{bmatrix} = \quad (9)$$

$$\begin{bmatrix} k_{s_1}(x, x') & k_{s_1}(x, x') & \ldots & k_{s_1}(x, x') \\ k_{s_1}(x, x') & k_{s_1}(x, x') + k_{s_2}(x, x') & \ldots & k_{s_1}(x, x') + k_{s_2}(x, x') \\ \vdots & \vdots & \ddots & \vdots \\ k_{s_1}(x, x') & k_{s_1}(x, x') + k_{s_2}(x, x') & \ldots & \sum_{j=1}^{n_s} k_{s_j}(x, x') + k_t(x, x') \end{bmatrix} +$$

$$\begin{bmatrix} \sigma_{s_1}^2 & 0 & \ldots & 0 \\ 0 & \sigma_{s_2}^2 & \ldots & 0 \\ \vdots & \vdots & \ddots & \vdots \\ 0 & 0 & \ldots & \sigma_t^2 \end{bmatrix}.$$

The second a posteriori model 214 can be determined (e.g., learned) by means of algorithm 4 in accordance with the first concept:

Algorithm 4: Learning the second a posteriori model 214 in accordance with the first concept
Input: respective known measurement points ($\mathcal{D}_{s1}$, $\mathcal{D}_{s2}$, . . . , $\mathcal{D}_t$) and respective kernel functions ($k_{s1}$, $k_{s2}$, . . . , $k_t$)
Output: $p(f_t|\mathcal{D}_t)$ 1. Define an a priori model for i=1 (e.g., as $f_s \sim \mathcal{GP}[0, k_{s_1}]$ if the associated known measurement points, $D_{s1}$, were previously standardized).
2. Optimize hyperparameters of the i=1 model such that the probability of the associated known measurement points $D_{s_1}$ being described by said model is at a maximum.
3. Determine an a posteriori model, $p(f_{s1}|\mathcal{D}_{s1})$, for i=1 by conditioning the model, $f_{s_1}$, using the optimized hyperparameters, on the associated known measurement points, $D_{s1}$.
4. Define an a priori model for i=2:

$$f_{s2} \sim \mathcal{GP}[\mathbb{E}(f_{s1}|\mathcal{D}_{s1}), \mathrm{cov}(f_{s1}|\mathcal{D}_{s1}) + k_{s2}].$$

5. Optimize hyperparameters of the i=2 model such that the probability of the associated known measurement points $D_{s_3}$ being described by said model is at a maximum. (The hyperparameters of the i=1 model are kept constant in this step.)
6. Determine an a posteriori model, $p(f_{s_2}|\mathcal{D}_{s_2})$, for i=2 by conditioning the model, $f_{s_2}$, using the optimized hyperparameters, on the associated known measurement points, $D_{s2}$.
7. ...
8. Define a second a priori model:

$$f_t \sim \mathcal{GP} \ [\mathbb{E} \ (f_{n_s}|\mathcal{D}_{n_s}), \ \text{cov}(f_{n_s}|\mathcal{D}_{n_s}) + k_t].$$

9. Optimize hyperparameters of the second a priori model such that the probability of the known second measurement points $D_t$ being described by said second model is at a maximum. (The hyperparameters of the i=1, ..., $n_s$ models are kept constant in this step.)
10. Determine a second a posteriori model 214 by conditioning the second model, $f_t$, using the optimized hyperparameters, on the known second measurement points, $D_t$.

function of the second a posteriori model 214 can be expanded to have the covariances of all $n_s$ other models. In this case, the common kernel function of all models can be described in accordance with equation (10):

$$k_s(x, x') + \sigma_s^2 \mapsto \begin{pmatrix} k_{s_1} + \sigma_{s_1}^2 & 0 & \cdots & 0 \\ 0 & k_{s_2} + \sigma_{s_2}^2 & \cdots & 0 \\ \vdots & \vdots & \ddots & \vdots \\ 0 & 0 & \cdots & k_{n_s} + \sigma_{n_s}^2 \end{pmatrix} \quad (10)$$

Illustratively, the extended covariance function can have the covariance of all $n_s$ other models in a block diagonal. Alternatively, an additional covariance term can be added to the prediction of each of the other models, except for the first other model. This results in a kernel function matrix of the variable $(2n_s-1)*(2n_s-1)$. In this case, the expression $((x,t),(x',t))$, $((x,t), (x',*))$, $((x,*), ((x',t))$, $((x,*),(x',*))$ in equation (6) can be extended to all other models except for i=1, and the common kernel function of all models can be described in accordance with equation (11):

$$\begin{bmatrix} k_t(x, x') + \sigma_t^2 & 0 \\ 0 & k_t(x, x') + \sum_s^{boost} \end{bmatrix} \mapsto \quad (10)$$

$$\begin{bmatrix} k_{s_2}(x, x') + \sigma_{s_2}^2 & 0 & \cdots & 0 & 0 \\ 0 & k_{s_2}(x, x') + \sum_{s_2,*}^{boost} & \cdots & 0 & 0 \\ \vdots & \vdots & \ddots & \vdots & \vdots \\ 0 & 0 & \cdots & k_t(x, x') + \sigma_t^2 & 0 \\ 0 & 0 & \cdots & 0 & k_t(x, x') + \sum_{t,s}^{boost} \end{bmatrix}.$$

The second a posteriori model 214 can be determined (e.g., learned) by means of algorithm 5 in accordance with the second concept:

Algorithm 5: Learning the second a posteriori model in accordance with the second concept Input: respective known measurement points $(\mathcal{D}_{s_1}, \mathcal{D}_{s_2}, \ldots, \mathcal{D}_t))$ and respective kernel functions $(k_{s_1}, k_{s_2}, \ldots, k_t)$ Output: $p(f_t|\mathcal{D}_t)$ 1. Define an a priori model for i=1 (e.g., as $f_s \sim \mathcal{GP} \ [0, k_{s_1}]$ if the associated known measurement points, $D_{s1}$, were previously standardized).
2. Optimize hyperparameters of the i=1 model such that the probability of the associated known measurement points $D_{s_1}$ being described by said model is at a maximum.
3. Determine an a posteriori model, $p(f_{s1}|\mathcal{D}_{s1})$, for i=1 by conditioning the model, $f_{s_1}$, using the optimized hyperparameters, on the associated known measurement points, $D_{s1}$.
4. Define an a priori model for i=2: $f_{s_2} \sim \mathcal{GP} \ [\mathbb{E} \ (f_{s_1}|\mathcal{D}_{s_1}), k_{s_2}]$.
5. Optimize hyperparameters of the i=2 model such that the probability of the associated known measurement points $D_{s_3}$ being described by said model is at a maximum. (The hyperparameters of the i=1 model are kept constant in this step.)
6. Determine an a posteriori model, $p(f_{s_2}|\mathcal{D}_{s_2})$, for i=2 by conditioning the model, $f_{s_2}$, using the optimized hyperparameters, on the associated known measurement points, $D_{s2}$.
7. ...
8. Define a second a priori model: $f_t \sim \mathcal{GP} \ [\mathbb{E} \ (f_{n_s}|\mathcal{D}_{n_s}), k_t]$.
9. Optimize hyperparameters of the second model such that the probability of the known second measurement points $D_t$ being described by said second model is at a maximum. (The hyperparameters of the i=1, ..., $n_s$ models are kept constant in this step.)
10. Determine a second a posteriori model 214 by conditioning the second model, $f_t$, using the optimized hyperparameters, on the known second measurement points, $D_t$, and by adding the additional covariance term in accordance with equation (7).

The learning of the second a posteriori model 214 described herein on the basis of $n_s$ other models (e.g., in accordance with algorithm 1, algorithm 2, algorithm 3 or algorithm 4) has a lower overall computational complexity for determining the second a posteriori model 214 in comparison with conventional Bayesian kernel methods that take into account uncertainties of the models. The overall computational complexity can be divided into: (i) a computational complexity for learning the other models, (ii) a computational complexity for learning the a posteriori model (e.g., the second a posteriori model 214) assuming that all other models have been learned, and (iii) a computational complexity for a prediction by the learned model. Table 1 shows a comparison of the computational complexities (i), (ii), (iii) of a conventional Bayesian kernel method, the hierarchical Gaussian process in accordance with reference [1], the sequential hierarchical Gaussian process in accordance with the first concept, and the amplified hierarchical Gaussian process in accordance with the second concept. In table 1, $N_s$ is the number of known measurement points of all n, other models in accordance with $N_s = \Sigma_{v=1}^{n_s} N_v$ where v=1, 2, ..., $n_s$; $N_t$ is the number of known measurement points of the target model to be learned (e.g., the number of known second measurement points).

TABLE 1

| Model | | Computational complexity | Number of optimized hyperparameters |
|---|---|---|---|
| Bayesian kernel method | (i) | not available because all models are learned together | — |
| | (ii) | $\mathcal{O}[(N_t + N_s)^3]$ | between $\mathcal{O}(n_s)$ and $\mathcal{O}(n_s^3)$ |
| | (iii) | $\mathcal{O}[(N_t + N_s)^2]$ | — |
| hierarchical Gaussian process in accordance with reference [1] | (i) | $\mathcal{O}[\Sigma_{v=1}^{n_s} N_v^3 + N_s^2]$ | $\mathcal{O}(n_s)$ |
| | (ii) | $\mathcal{O}[N_t^3 + N_t N_s]$ | $\mathcal{O}(1)$ |
| | (iii) | $\mathcal{O}[N_t^2 + N_s]$ | — |
| sequential hierarchical Gaussian process in accordance with the first concept | (i) | $\mathcal{O}[N_s^3]$ | $\mathcal{O}(n_s)$ |
| | (ii) | $\mathcal{O}[N_t^3 + N_t^2 N_s + N_t N_s^2]$ | $\mathcal{O}(1)$ |
| | (iii) | $\mathcal{O}[(N_t + N_s)^2]$ | — |
| amplified hierarchical Gaussian process in accordance with the second concept | (i) | $\mathcal{O}[N_s^3]$ | $\mathcal{O}(n_s)$ |
| | (ii) | $\mathcal{O}[N_t^3 + N_t^2 N_s + N_t N_s^2]$ | $\mathcal{O}(1)$ |
| | (iii) | $\mathcal{O}[(N_t + N_s)^2]$ | — |

The other models can be learned at the beginning of Bayesian optimization; re-learning during Bayesian optimization is not necessary. Therefore, the computational complexity (i) of learning the other models has a comparatively low influence on overall computational complexity. Learning the a posteriori model can be performed once in every iteration of the Bayesian optimization in order to adapt the a posteriori model with respect to the measurement point newly detected in the respective iteration (see, for example, 4. in algorithm 3). As shown in table 1, learning the a posteriori model in accordance with the conventional Bayesian Kernel method scales cubically (i.e., with a power of three) with the total number of known measurement points, $N_t + N_s$, which is why this can be a limiting factor in Bayesian optimization. Usually, the number, $N_t$, of known measurement points of the target model to be learned can be significantly lower than the number, $N_s$, of the known measurement points of all $n_s$ other models (i.e., $N_t \ll N_s$). For this usual case, learning the a posteriori model in accordance with the first concept and learning the a posteriori model in accordance with the second concept can reduce the computational complexity of the cubic scaling to a quadratic relationship in $N_s$. Furthermore, when the a posteriori model is learned in accordance with the first concept and when the a posteriori model is learned in accordance with the second concept, only optimization of the hyperparameters of the model to be learned is required such that fewer hyperparameters are optimized in comparison with the conventional Bayesian kernel method in which all models are optimized together, and the computational complexity is thereby further reduced. A prediction of the learned model can be performed several times during the optimization of the acquisition function in each iteration of the Bayesian optimization (see, for example, 1. in algorithm 3). Therefore, the computational complexity (iii) for the prediction of the learned model is also relevant for the overall computational complexity. As shown in table 1, the computational complexity (iii) of the first concept and the second concept corresponds to the computational complexity (iii) of the conventional Bayesian kernel method. It is true that reference [1] reduces said computational complexity (iii), but reference [1] provides no sound way to take into account the uncertainties of the $n_s$ other models. In principle, it is not possible to map any covariances between the individual measured values of the other models. Correctly taking into account the uncertainties of the $n_s$ other models can increase the efficiency of the Bayesian optimization.

Figure 3A:
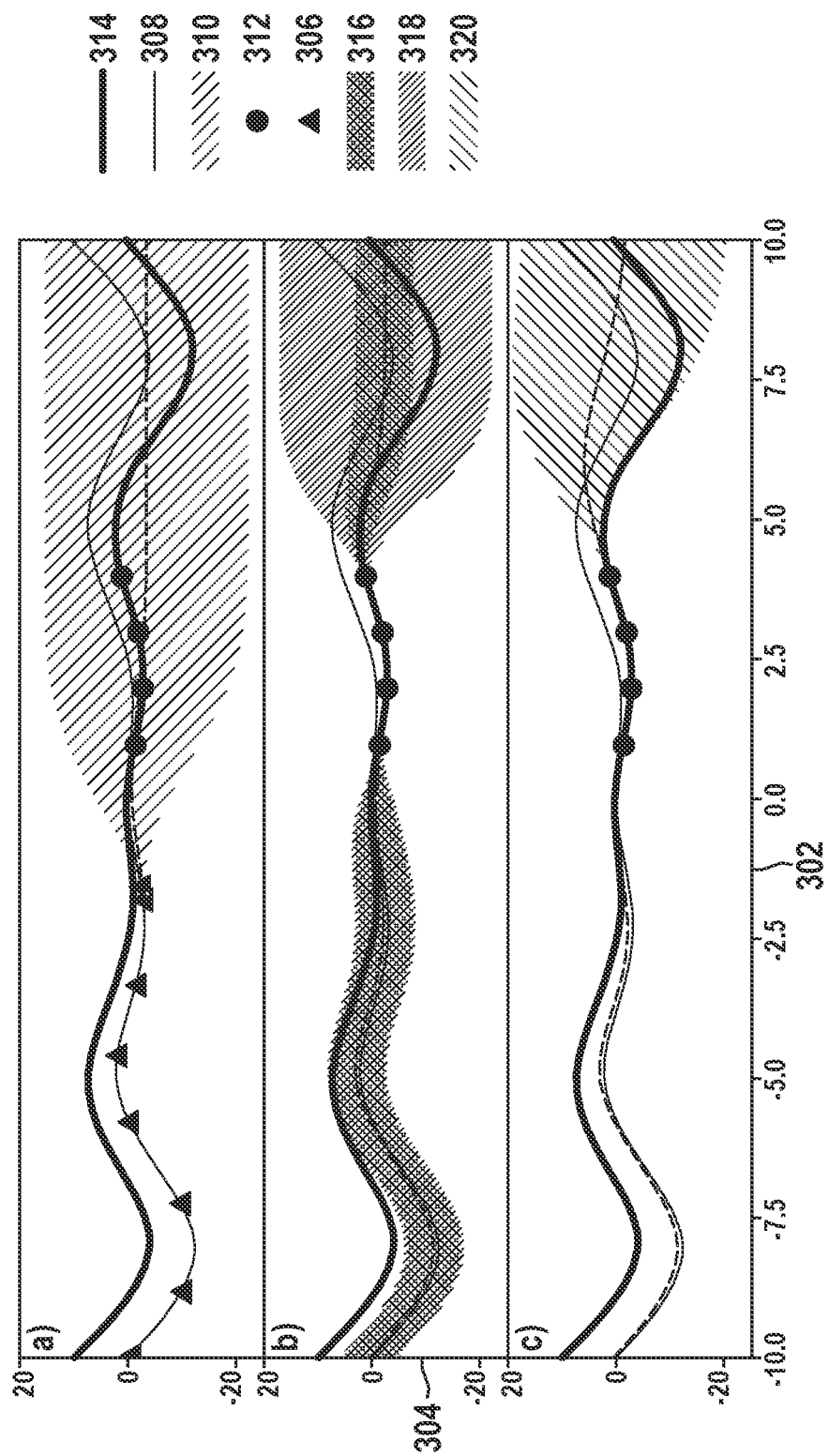
FIGS. 3A and 3B each show an exemplary visualization of various models or the course of optimizations based on different models according to various example embodiments of the present invention.

To illustrate this, FIG. 3A shows an exemplary visualization of the hierarchical Gaussian process 316 in accordance with reference [1] where $\beta=1$, the sequential hierarchical Gaussian process 320 in accordance with the first concept and the amplified hierarchical Gaussian process 318 in accordance with the second concept. FIG. 3A shows a source function 308 that is modeled by an exemplary first a posteriori model and a target function 314 that is modeled by an exemplary second a posteriori model, each of which describes a relationship between (an) input parameter value(s) 302 and (an) output value(s) 304. The first a posteriori model describing the source function 308 is determined or can be determined on the basis of known first measurement points, $D_s$, 306. For the target function 314, which is described by the second a posteriori model, there can be known second measurement points, $D_t$, 312. Illustration (a) shows that the first a posteriori model has a comparatively high uncertainty 310 in the right-hand region, in which there are no known first measurement points, $D_s$, 306. Illustration (b) shows that a posteriori model learned by means of the hierarchical Gaussian process 316 in accordance with reference [1] where $\beta=1$ underestimates the uncertainty in said right-hand region. In contrast, illustrations (b) and (c) show that both the a posteriori model learned by means of the sequential hierarchical Gaussian process 320 in accordance with the first concept and the a posteriori model learned by means of the amplified hierarchical Gaussian process 318 in accordance with the second concept take into account the uncertainty in said right-hand region.

Figure 3B:
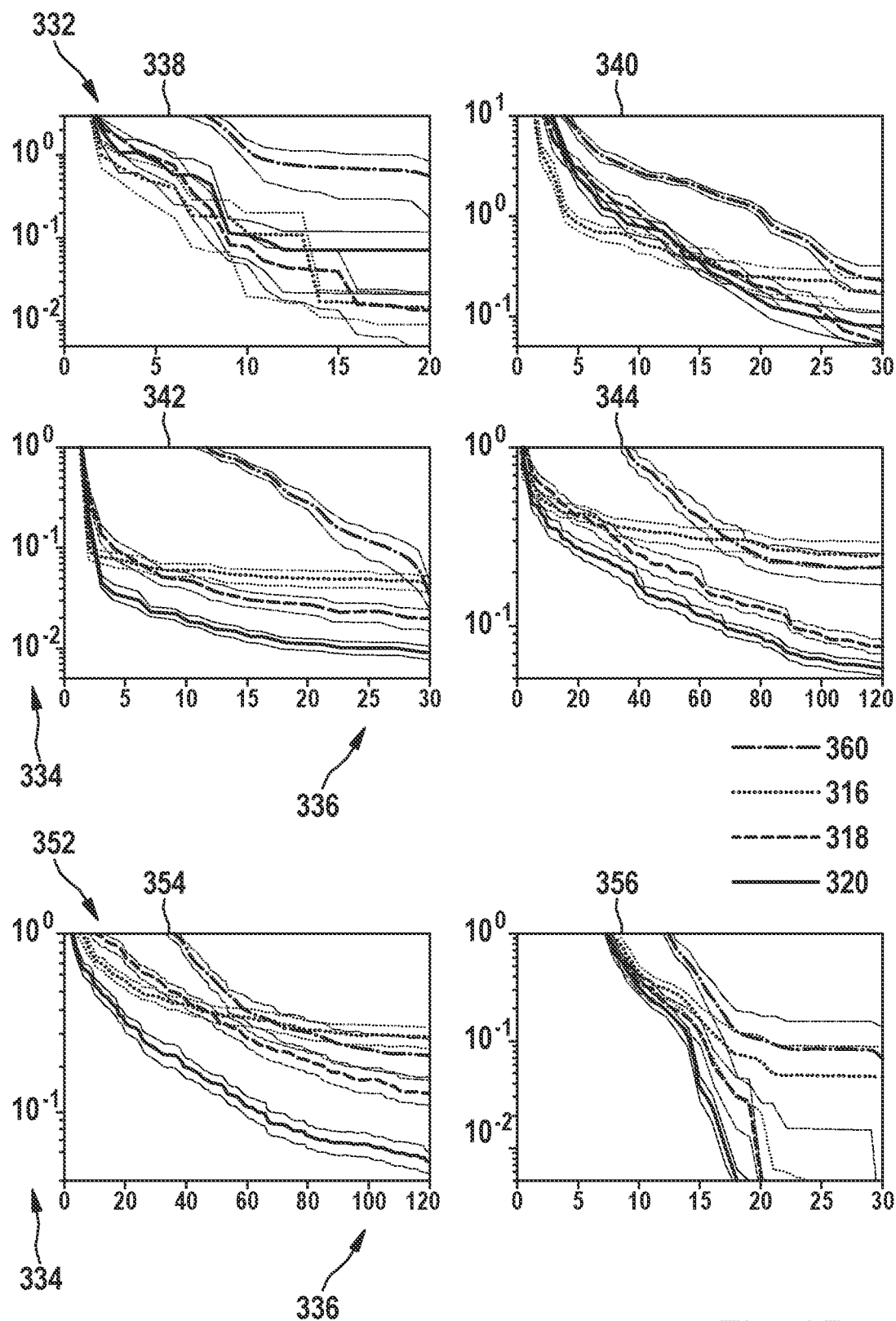

FIG. 3B shows a comparison of the conventional Bayesian kernel method 360 (without transfer learning), the hierarchical Gaussian process 316 in accordance with reference [1] where $\beta=1$, the sequential hierarchical Gaussian process 320 in accordance with the first concept, and the amplified hierarchical Gaussian process 318 in accordance with the second concept. Illustration 332 shows a Bayesian optimization for another model ($n_s=1$) having a simple regret 334 as a function of the optimization iteration 336, by way of example for a one-dimensional Forrester function 338, a two-dimensional Branin function 340, a three-dimensional Hartmann function 342, and a six-dimensional Hartmann function 344. Illustration 352 shows a Bayesian optimization for a plurality of other models having a simple regret 334 as a function of the optimization iteration 336, by way of example for a Hartmann 6 function 354 having three other models ($n_s=3$) and an Alpine function 356 having five other models ($n_s=5$). The smaller the simple regret value, the better the optimum found; and the fewer optimization iterations 336 a small simple regret value is found in, the higher the efficiency of the Bayesian optimization. Illustratively, FIG. 3B shows that the improvement in the efficiency of the Bayesian optimization in accordance with the first concept and the second concept increases as compared to the other methods as the number of dimensions increases (see illustration 332, e.g., the six-dimensional Hartmann 6 function 344). A significant increase in efficiency is also shown in the case of a plurality of other models ($n_s>1$) (see illustration 352, e.g., the Alpine function 356 where $n_s=5$).

Illustratively, the concepts of transfer learning described herein in which the uncertainty of all previous models is propagated (i.e., propagation of uncertainty) lead to accelerated Bayesian optimization. For example, in the event that only a few measurement points for determining a model are present or can be detected (e.g., due to a comparatively very high expenditure (e.g., time expenditure, energy consumption, outlay, etc.), the transfer learning described herein can significantly increase the efficiency of learning due to the propagation of the uncertainty. Conventional Bayesian optimization methods take into account the uncertainty either completely, which increases a computational effort, or not at all, which can lead to errors in the learned model and to significant inaccuracies in the model if few measurement points are present. The concepts described herein can both take the uncertainty into account and allow comparatively high learning efficiency. The transfer learning described herein provides comparatively high data and optimization efficiency by propagating uncertainties.

Figure 4:
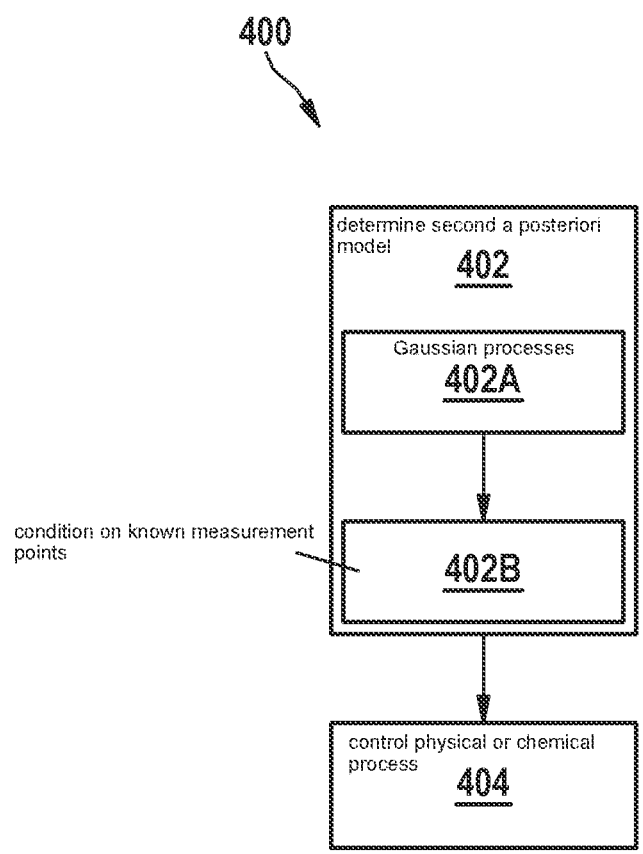
FIG. 4 shows a method for controlling a physical or chemical process according to various example embodiments of the present invention.

FIG. 4 shows a flowchart of a method 400 for controlling a physical or chemical process according to various embodiments.

The method 400 can comprise determination of a second a posteriori model taking into account a first a posteriori model (in 402). The second a posteriori model can describe a relationship between at least one input variable and at least one output variable of the physical or chemical process. The first a posteriori model can describe a relationship between at least one input variable and at least one output variable of a process related to the physical or chemical process.

The determination (in 402) of the second a posteriori model by taking into account the first a posteriori model can comprise determination of a plurality of Gaussian processes having a common covariance function (in 402A). Each Gaussian process of the plurality of Gaussian processes can be determined by drawing a function from the first a posteriori model and forming the expected value of the respective Gaussian process.

According to various embodiments, the second a posteriori model can be determined at least by means of one of two concepts (also referred to as approaches). According to the first concept, the plurality of Gaussian processes having the common covariance function can first be averaged and then the averaged Gaussian process can be conditioned on known measurement points. According to the second concept, the plurality of Gaussian processes can in each case be conditioned on the known measurement points and then the conditioned plurality of Gaussian processes can be averaged.

According to the first concept, the determination (in 402) of the second a posteriori model by taking into account the first a posteriori model can further comprise determining a second a priori model as a mean value of the plurality of Gaussian processes and determining the second a posteriori model by conditioning the a priori model on the known measurement points (in 402B). For example, the determination (in 402) of the second a posteriori model by taking into account the first a posteriori model can comprise: optimizing the hyperparameters of the second a priori model such that the probability of the known second measurement points $D_t$ being described by the second a priori model is increased (e.g., is at a maximum), and conditioning the second a priori model, $f_t$, on the known second measurement points, $D_t$, using the optimized hyperparameters.

According to various embodiments, the hyperparameters of the covariance function of the first model can remain unchanged when the second model is trained or learned (e.g., the hyperparameters are optimized).

In accordance with the second concept, the determination (in 402) of the second a posteriori model can further comprise conditioning each Gaussian process of the plurality of Gaussian processes on the known measurement points and determining the second a posteriori model as a mean value of the conditioned plurality of Gaussian processes (in 402B). The second concept also makes it possible to benefit from the fact that the hyperparameters of the first model do not have to be reoptimized when the second model is trained.

The method 400 can further comprise controlling the physical or chemical process using the second a posteriori model (in 404).

What is claimed is:

1. A method for controlling a physical or chemical process, wherein each measurement point of known measurement points has an input parameter value of at least one input variable of the physical or chemical process and an output value associated with the input parameter value, of at least one output variable of the physical or chemical process, and wherein a first a posteriori model describes a relationship between at least one input variable and at least one output variable of another process related to the physical or chemical process, the method comprising:
 determining a second a posteriori model using the first a posteriori model, wherein the second a posteriori model describes a relationship between the at least one input variable and at least one output variable of the physical or chemical process, wherein the determining of the second a posteriori model includes:
  determining a plurality of Gaussian processes having a common covariance function, wherein each of the Gaussian processes is determined by drawing a function from the first a posteriori model and forming an expected value of the Gaussian process; and
  (i) determining an a priori model as a mean value of the plurality of Gaussian processes and determining the second a posteriori model by optimizing hyperparameters of the model using the known measurement points in such a way that at least one hyperparameter of a covariance function of the first a posteriori model remains unchanged, and conditioning the model on the known measurement points, or (ii) conditioning each Gaussian process of the plurality of Gaussian processes on the known measurement points and determining the second a posteriori model as a mean value of the conditioned plurality of Gaussian processes; and
 controlling the physical or chemical process using the second a posteriori model.

2. The method according to claim 1, further comprising:
 selecting a new input parameter value of the at least one input variable of the physical or chemical process using an acquisition function based on the second a posteriori model;
 measuring the output value of the at least one output variable which is associated with the new input parameter value, wherein the selected new input parameter value and the measured new output value form a new measurement point, and
 adapting the second a posteriori model by means of the new measurement point, wherein the adapted second a posteriori model describes the physical or chemical process at the known measurement points and the new measurement point;

wherein the physical or chemical process is controlled using the adapted second a posteriori model.

3. The method according to claim 1, wherein a third a posteriori model describes the relationship between at least one input variable and at least one output variable of yet another process related to the physical or chemical process, and wherein each other measurement point of known other measurement points has an input parameter value of at least one input variable of the other process and an output value, associated with the input parameter value, of at least one output variable of the other process, wherein the method further comprises:

determining the first a posteriori model by taking into account the third a posteriori model, the determining of the first a posteriori model including:

determining a plurality of other Gaussian processes having another common covariance function, wherein each of the other Gaussian processes is determined by drawing a function from the third a posteriori model and forming an expected value of the other Gaussian process; and (i) determining another a posteriori model as a mean value of the plurality of other Gaussian processes and determining the first a posteriori model by conditioning the other a posteriori model on the known other measurement points, or (ii) conditioning each other Gaussian process of the plurality of other Gaussian processes on the known other measurement points and determining the first a posteriori model as a mean value of the conditioned plurality of other Gaussian processes.

4. The method according to claim 1, wherein the controlling of the physical or chemical process using the second a posteriori model includes:

determining an input parameter value of the at least one input variable, which input parameter value is associated with a desired output value of the at least one output variable of the physical or chemical process in accordance with the second a posteriori model;

controlling the physical or chemical process in accordance with the determined input parameter value.

5. A device configured to for controlling a physical or chemical process, wherein each measurement point of known measurement points has an input parameter value of at least one input variable of the physical or chemical process and an output value associated with the input parameter value, of at least one output variable of the physical or chemical process, and wherein a first a posteriori model describes a relationship between at least one input variable and at least one output variable of another process related to the physical or chemical process, the device configured to:

determine a second a posteriori model using the first a posteriori model, wherein the second a posteriori model describes a relationship between the at least one input variable and at least one output variable of the physical or chemical process, wherein the determining of the second a posteriori model includes:

determining a plurality of Gaussian processes having a common covariance function, wherein each of the Gaussian processes is determined by drawing a function from the first a posteriori model and forming an expected value of the Gaussian process; and (i) determining an a priori model as a mean value of the plurality of Gaussian processes and determining the second a posteriori model by optimizing hyperparameters of the model using the known measurement points in such a way that at least one hyperparameter of a covariance function of the first a posteriori model remains unchanged, and conditioning the model on the known measurement points, or (ii) conditioning each Gaussian process of the plurality of Gaussian processes on the known measurement points and determining the second a posteriori model as a mean value of the conditioned plurality of Gaussian processes; and control the physical or chemical process using the second a posteriori model.

6. A system, comprising:

a device configured to carry out a physical or chemical process; and a control device that is configured, for a desired output value of the at least one output variable of the physical or chemical process, to determine, by using a second a posteriori model, an input parameter value that is associated with the desired output value, and to control the device for carrying out the physical or chemical process in accordance with the determined input parameter value;

wherein each measurement point of known measurement points has an input parameter value of at least one input variable of the physical or chemical process and an output value associated with the input parameter value, of at least one output variable of the physical or chemical process, and wherein a first a posteriori model describes a relationship between at least one input variable and at least one output variable of another process related to the physical or chemical process, and the second a posterior model being determined using the first a posteriori model, wherein the second a posteriori model describes a relationship between the at least one input variable and at least one output variable of the physical or chemical process, wherein the determining of the second a posteriori model includes:

determining a plurality of Gaussian processes having a common covariance function, wherein each of the Gaussian processes is determined by drawing a function from the first a posteriori model and forming an expected value of the Gaussian process; and (i) determining an a priori model as a mean value of the plurality of Gaussian processes and determining the second a posteriori model by optimizing hyperparameters of the model using the known measurement points in such a way that at least one hyperparameter of a covariance function of the first a posteriori model remains unchanged, and conditioning the model on the known measurement points, or (ii) conditioning each Gaussian process of the plurality of Gaussian processes on the known measurement points and determining the second a posteriori model as a mean value of the conditioned plurality of Gaussian processes.

7. The system according to claim 6, wherein the physical or chemical process is:

machining a workpiece; or setting a device; or producing a product; or moving a robot arm.

8. A non-transitory computer-readable medium on which is stored instructions for controlling a physical or chemical process, wherein each measurement point of known measurement points has an input parameter value of at least one input variable of the physical or chemical process and an output value associated with the input parameter value, of at least one output variable of the physical or chemical process, and wherein a first a posteriori model describes a relationship between at least one input variable and at least one output variable of another process related to the physical or chemical process, the instructions, when executed by a processor, causing the processor to perform the following steps:

determining a second a posteriori model using the first a posteriori model, wherein the second a posteriori model describes a relationship between the at least one input variable and at least one output variable of the physical or chemical process, wherein the determining of the second a posteriori model includes:

determining a plurality of Gaussian processes having a common covariance function, wherein each of the Gaussian processes is determined by drawing a function from the first a posteriori model and forming an expected value of the Gaussian process; and (i) determining an a priori model as a mean value of the plurality of Gaussian processes and determining the second a posteriori model by optimizing hyperparameters of the model using the known measurement points in such a way that at least one hyperparameter of a covariance function of the first a posteriori model remains unchanged, and conditioning the model on the known measurement points, or (ii) conditioning each Gaussian process of the plurality of Gaussian processes on the known measurement points and determining the second a posteriori model as a mean value of the conditioned plurality of Gaussian processes; and controlling the physical or chemical process using the second a posteriori model.

\* \* \* \* \*